(12) United States Patent
Kim et al.

(10) Patent No.: US 12,096,387 B2
(45) Date of Patent: Sep. 17, 2024

(54) COMMUNICATION METHOD AND DEVICE IN WIRELESS COMMUNICATION SYSTEM

(71) Applicant: Samsung Electronics Co., Ltd., Suwon-si (KR)

(72) Inventors: Sangbum Kim, Suwon-si (KR); Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/057,081

(22) PCT Filed: May 21, 2019

(86) PCT No.: PCT/KR2019/006058
§ 371 (c)(1),
(2) Date: Nov. 19, 2020

(87) PCT Pub. No.: WO2019/225943
PCT Pub. Date: Nov. 28, 2019

(65) Prior Publication Data
US 2021/0321351 A1    Oct. 14, 2021

(30) Foreign Application Priority Data

May 21, 2018  (KR) .................. 10-2018-0057995

(51) Int. Cl.
*H04W 56/00*    (2009.01)
*H04L 27/26*    (2006.01)
(Continued)

(52) U.S. Cl.
CPC ..... *H04W 56/005* (2013.01); *H04L 27/26025* (2021.01); *H04W 72/0446* (2013.01);
(Continued)

(58) Field of Classification Search
CPC ........... H04W 56/005; H04W 72/0446; H04W 72/0453; H04W 72/1268; H04W 80/02; H04L 27/26025
See application file for complete search history.

(56) References Cited

U.S. PATENT DOCUMENTS

| 8,934,459 B2 | 1/2015 | Marinier et al. |
| 10,736,103 B2 | 8/2020 | Kim et al. |

(Continued)

FOREIGN PATENT DOCUMENTS

| CN | 108012329 A | 5/2018 |
| EP | 3681218 A1 | 7/2020 |

(Continued)

OTHER PUBLICATIONS

NTT Docomo, Inc., "Remaining issues on TA related aspects", 3GPP TSG RAN WG1 Meeting #93, May 21-25, 2018, R1-1807057, 2 pages.

(Continued)

*Primary Examiner* — Michael Thier
*Assistant Examiner* — Nevena Zecevic Sandhu

(57) ABSTRACT

A method, performed by a user equipment (UE), of transmitting and receiving a signal in a wireless communication system according to an embodiment of the present disclosure includes: receiving timing advance command information from a base station in a first time slot; identifying at least one uplink carrier to which the timing advance command information is applied; and changing, based on the timing advance command information, uplink timing of the at least one uplink carrier in a second time slot.

8 Claims, 22 Drawing Sheets

(51) Int. Cl.
  *H04W 72/0446* (2023.01)
  *H04W 72/0453* (2023.01)
  *H04W 72/1268* (2023.01)
  *H04W 80/02* (2009.01)

(52) U.S. Cl.
  CPC ... *H04W 72/0453* (2013.01); *H04W 72/1268* (2013.01); *H04W 80/02* (2013.01)

(56) References Cited

U.S. PATENT DOCUMENTS

| | | | |
|---|---|---|---|
| 2011/0090840 | A1 | 4/2011 | Lee et al. |
| 2011/0243111 | A1 | 10/2011 | Andgart et al. |
| 2013/0188620 | A1 | 7/2013 | Dinan |
| 2013/0195048 | A1 | 8/2013 | Ekpenyong et al. |
| 2019/0215861 | A1* | 7/2019 | Son .................. H04W 72/14 |
| 2019/0313407 | A1* | 10/2019 | Tsai ................ H04W 72/0453 |
| 2021/0058885 | A1* | 2/2021 | Shao .................. H04L 5/0007 |

FOREIGN PATENT DOCUMENTS

| | | |
|---|---|---|
| KR | 20100010021 A | 1/2010 |
| KR | 20110102683 A | 9/2011 |
| KR | 10-2013-0012593 A | 2/2013 |
| KR | 10-2017-0111965 A | 10/2017 |

OTHER PUBLICATIONS

Huawei et al., "Remaining issues on TA aspects", 3GPP TSG RAN WG1 Meeting #93, May 21-25, 2018, R1-1805879, 3 pages.
International Search Report dated Aug. 30, 2019 in connection with International Patent Application No. PCT/KR2019/006058, 2 pages.
Supplementary European Search Report issued May 31, 2021, in connection with European Patent Application No. 19806823.1, 10 pages.
MediaTek INC, "On remaining issues of RACH procedure" 3GPP TSG RAN WG1 Meeting #93, R1-1807417, Busan, Korea, May 21-25, 2018, 7 pages.
Written Opinion of the International Searching Authority dated Aug. 30, 2019 in connection with International Patent Application No. PCT/KR2019/006058, 5 pages.
European Patent Office, "Communication under Rule 71(3) EPC—Intention to Grant," dated Mar. 16, 2023, in connection with European Patent Application No. 19806823.1, 78 pages.
European Patent Office, "Comminucation under Rule 71(3) EPC" dated Jul. 13, 2023, in connection with European Patent Application No. 19806823.1, 78 pages.
Korean Intellectual Property Office, "Office Action," issued Jun. 2, 2023, in connection with Korean Patent Application No. 10-2018-0057995, 6 pages.
Popp et al., "Energy Consumption of Low Data Rate M2M Communications in LTE," Smart SysTech, Jun. 2015, Aachen, Germany, 5 pages.

* cited by examiner (a)

(b)

(c)

COMMUNICATION METHOD AND DEVICE IN WIRELESS COMMUNICATION SYSTEM

CROSS-REFERENCE TO RELATED APPLICATIONS

This application is a 371 of International Application No. PCT/KR2019/006058 filed on May 21, 2019, which claims priority to Korean Patent Application No. 10-2018-0057995 filed on May 21, 2018, the disclosures of which are herein incorporated by reference in their entirety.

BACKGROUND

1. Field

The present disclosure relates to a method and apparatus for performing communication in a wireless communication system.

2. Description of Related Art

Efforts have been made to develop an improved $5^{th}$ generation (5G) communication system or pre-5G communication system to keep up with growing wireless data traffic demand after the commercialization of $4^{th}$ generation (4G) communication systems. For this reason, the 5G or pre-5G communication system is called a beyond 4G network communication system or a post long-term evolution (LTE) system. A 5G communication system defined in the $3^{rd}$ Generation Partnership Project (3GPP) is called a new radio (NR) system. Implementation of 5G communication systems in an ultra-high frequency (millimeter-wave (mm-Wave)) band (such as a 60-GHz band) is under consideration to achieve high data transfer rates. To mitigate path loss and increase transmission distance during radio wave propagation in an ultra-high frequency band for 5G communication systems, various technologies such as beamforming, massive multiple-input multiple-output (massive MIMO), full dimensional MIMO (FD-MIMO), array antennas, analog beamforming, and large-scale antennas are being studied and applied to NR systems. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. The Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, 5G communication technologies, such as sensor networks, M2M communication, MTC, etc., are implemented using techniques such as beamforming, MIMO, array antennas, etc. The application of a cloud RAN as the above-described big data processing technology is an example of convergence between the 5G and IoT technologies.

As various services may be provided due to the development of mobile communication systems and the aforementioned techniques, in particular, a method capable of effectively providing these services is required.

Embodiments of the present disclosure provide an apparatus and method capable of effectively providing a service in a wireless communication system.

SUMMARY

According to an embodiment, a method, performed by a user equipment (UE), of transmitting and receiving a signal in wireless communication system includes: receiving timing advance command information from a base station in a first time slot; identifying at least one uplink carrier to which the timing advance command information is applied; and changing, based on the timing advance command information, uplink timing of the at least one uplink carrier in a second time slot.

According to embodiments of the present disclosure, an apparatus and method for effectively providing a service in a wireless communication system are provided.

DETAILED DESCRIPTION

Figure 1A:
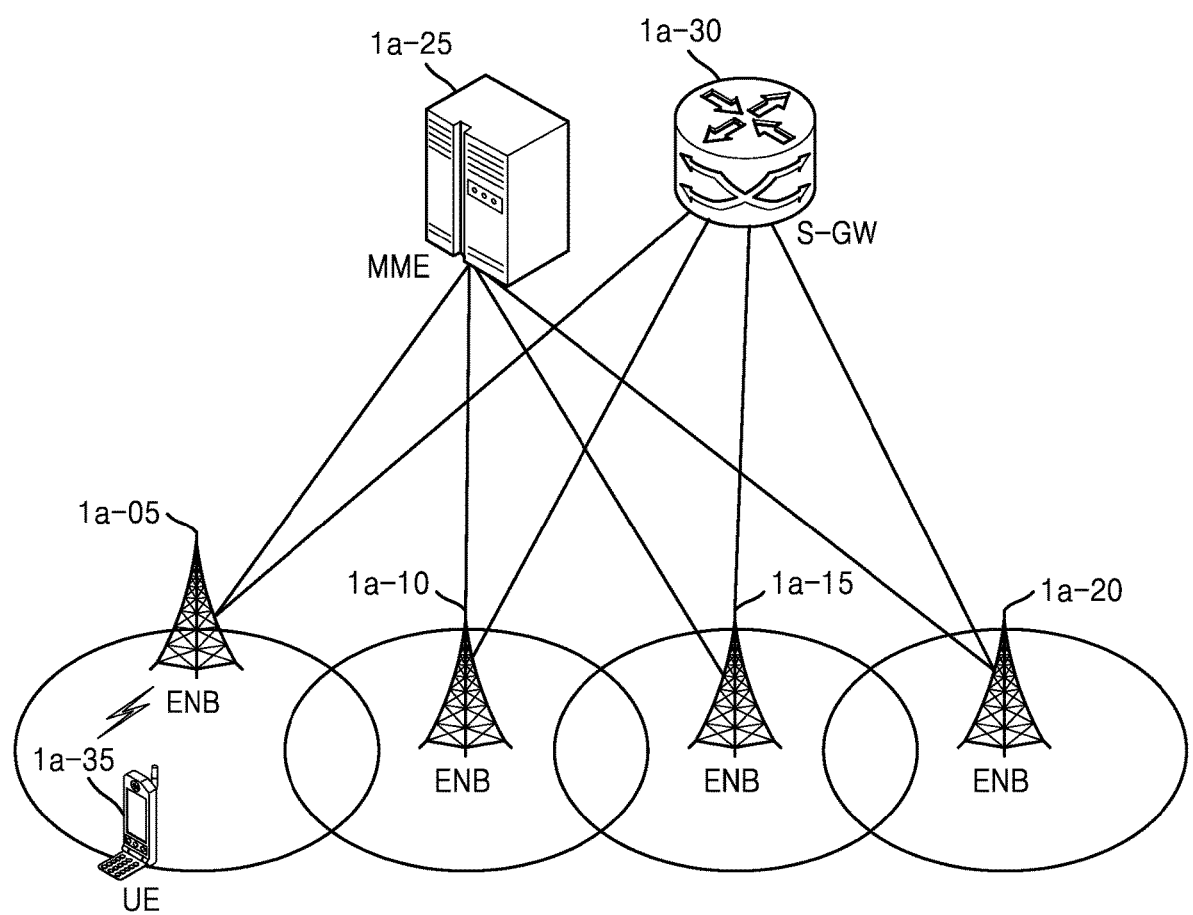
FIG. 1A illustrates a structure of a long term evolution (LTE) system according to an embodiment.

According to an embodiment of the present disclosure, a method, performed by a user equipment (UE), of transmitting and receiving a signal in a wireless communication system includes: receiving timing advance command information from a base station in a first time slot; identifying at least one uplink carrier to which the timing advance command information is applied; and changing, based on the timing advance command information, uplink timing of the at least one uplink carrier in a second time slot.

Hereinafter, embodiments of the present disclosure will be described in detail with reference to the accompanying drawings. In the following description of embodiments, descriptions of technical features that are well known in the art to which the present disclosure pertains and are not directly related to the present disclosure are omitted. This is for clearly describing the essence of the present disclosure without obscuring it by omitting the unnecessary descriptions.

For the same reason, in the accompanying drawings, some components are exaggerated, omitted, or schematically illustrated. Furthermore, the size of each element does not entirely reflect an actual size thereof. In the drawings, the reference numerals refer to the same or corresponding elements throughout.

Advantages and features of the present disclosure and methods of accomplishing the same will be more readily appreciated by referring to the following description of embodiments and the accompanying drawings. However, the present disclosure should not be construed as being limited to embodiments set forth below but may be embodied in many different forms. Rather, the present embodiments are provided so that the present disclosure will be thorough and complete and will fully convey the concept of the present disclosure to those of ordinary skill in the art, and the present disclosure will only be defined by the appended claims. Throughout the specification, like reference numerals refer to like elements.

It will be understood that combinations of blocks in process flow diagrams and flowcharts in the drawings may be performed by computer program instructions. These computer program instructions may be loaded into a processor of a general-purpose computer, special-purpose computer, or another programmable data processing equipment, and thus, the instructions performed via the processor of the computer or the other programmable data processing equipment create a means for performing functions specified in the flowchart block(s). The computer program instructions may also be stored in a computer-executable or computer-readable memory capable of directing the computer or the other programmable data processing equipment to implement functions in a specific manner, and thus, the instructions stored in the computer-executable or computer-readable memory are capable of producing items including instruction means for performing the functions described in the flowchart block(s). The computer program instructions may also be loaded into the computer or the other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It is also noted that, in some alternative implementations, functions described in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs a certain function. However, the term 'unit' is not limited to software or hardware. The 'unit' may be configured to be in an addressable storage medium or configured to operate one or more processors. Thus, the term 'unit' may include, for example, elements such as software elements, object-oriented software elements, class elements, and task elements, processes, functions, attributes, procedures, subroutines, segments of program code, drivers, firmware, micro-codes, circuits, data, a database, data structures, tables, arrays, and variables. The elements and functions provided by the 'units' may be combined into a smaller number of elements and 'units', or may be further divided into a larger number of elements and 'units'. Furthermore, the elements and 'units' may be embodied to reproduce one or more central processing units (CPUs) in a device or security multimedia card. In addition, in an embodiment, the 'unit' may include one or more processors.

As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

Hereinafter, for convenience of description, the present disclosure uses terms and names defined in the 3$^{rd}$ Generation Partnership Project Long-Term Evolution (3GPP LTE) specifications or terms and names modified based thereon. However, the present disclosure is not limited to the terms and names but may also be identically applied to systems that comply with other standards. In the present disclosure, for convenience of description, eNB may be used interchangeably with gNB. In other words, a base station described as eNB may represent gNB.

FIG. 1A illustrates a structure of an LTE system to which an embodiment is applied.

Referring to FIG. 1A, a radio access network for the LTE system consists of next-generation base stations that are evolved Node Bs (hereinafter referred to as eNBs, Node Bs, or base stations) 1a-05, 1a-10, 1a-15, and 1a-20, a mobility management entity (MME) 1a-25, and a serving-gateway (S-GW) 1a-30. A user equipment (hereinafter, referred to as a 'UE' or terminal) 1a-35 may connect to an external network via the eNBs 1a-05 through 1a-20 and the S-GW 1a-30.

In FIG. 1A, the eNBs 1a-05 through 1a-20 correspond to node Bs in a Universal Mobile Telecommunication System (UMTS). The eNBs 1a-05 through 1a-20 are each connected to the UE 1a-35 via radio channels and perform more complicated functions than the Node Bs. In the LTE system, as all user traffic including real-time services like voice over Internet protocol (VoIP) services is served on shared channels, an entity may be needed to perform scheduling by collecting status information such as buffer states, available transmit power states, and channel states for UEs. Each of the eNBs 1a-05 through 1a-20 may perform the scheduling function. One eNB typically controls a plurality of cells. For example, to achieve a data rate of 100 megabits per second (Mbps), the LTE system may utilize Orthogonal Frequency Division Multiplexing (hereinafter abbreviated as OFDM) in a 20 MHz bandwidth as a radio access technology. Furthermore, the eNBs 1a-05 through 1a-20 may apply Adaptive Modulation & Coding (hereinafter abbreviated as AMC) that determines a modulation scheme and a channel coding rate according to channel states for UEs. The S-GW 1a-30 is an entity for providing a data bearer and creates or deletes the data bearer according to control by the MME 1a-25. The MME 1a-25 is responsible for performing various control functions as well as mobility management for a UE and is connected to multiple base stations.

Figure 1B:
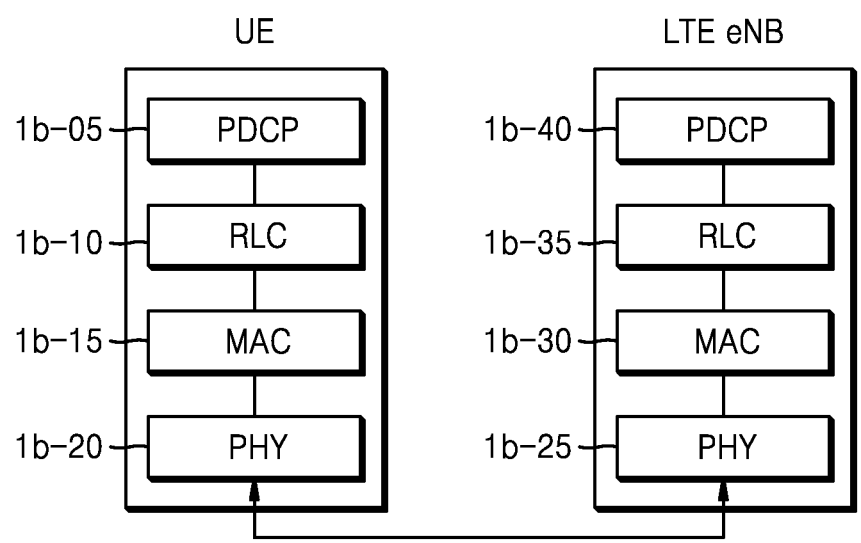
FIG. 1B illustrates a radio protocol architecture for an LTE system, according to an embodiment of the present disclosure.

FIG. 1B illustrates a radio protocol architecture for an LTE system to which an embodiment is applied.

Referring to FIG. 1B, a radio protocol stack for each of a UE and an eNB in the LTE system may include packet data convergence protocol (PDCP) 1b-05 or 1b-40, radio link control (RLC) 1b-10 or 1b-35, and medium access control (MAC) 1b-15 or 1b-30. The PDCP 1b-05 or 1b-40 may be responsible for performing compression/decompression of an IP header. The main functions of the PDCP 1b-05 or 1b-40 are summarized as follows.

- Header compression and decompression (robust header compression (ROHC) only)
- Transfer of user data
- In-sequence delivery of upper layer packet data units (PDUs) at PDCP re-establishment procedure for RLC acknowledged mode (AM)
- For split bearers in dual connectivity (DC) (only support for RLC AM): PDCP PDU routing for transmission and PDCP PDU reordering for reception
- Duplicate detection of lower layer service data units (SDUs) at PDCP re-establishment procedure for RLC AM
- Retransmission of PDCP SDUs at handover and, for split bearers in DC, retransmission of PDCP PDUs at PDCP data-recovery procedure for RLC AM
- Ciphering and deciphering
- Timer-based SDU discard in uplink The RLC 1b-10 or 1b-35 may reconfigure PDCP PDUs of an appropriate size to perform an automatic repeat request (ARQ) operation, etc. The main functions of the RLC 1b-10 or 1b-35 are summarized as follows.

- Transfer of upper layer PDUs
- Error correction through ARQ (only for AM data transfer)
- Concatenation, segmentation and reassembly of RLC SDUs (only for UM and AM data transfer)
- Re-segmentation of RLC data PDUs (only for AM data transfer)
- Reordering of RLC data PDUs (only for unacknowledged mode (UM) and AM data transfer)
- Duplicate detection (only for UM and AM data transfer)
- Protocol error detection (only for AM data transfer)
- RLC SDU discard (only for UM and AM data transfer)
- RLC re-establishment The MAC 1b-15 or 1b-30 is connected with multiple RLC layer apparatuses configured in a UE and may multiplex RLC PDUs into MAC PDUs and demultiplex RLC PDUs from MAC PDUs. The main functions of the MAC 1b-15 or 1b-30 are summarized as follows.

- Mapping between logical channels and transport channels
- Multiplexing/demultiplexing of MAC SDUs belonging to one or different logical channels into/from transport blocks (TBs) delivered to/from the physical layer on transport channels
- Scheduling information reporting
- Error correction through hybrid ARQ (HARM)
- Priority handling between logical channels of one UE
- Priority handling between UEs by means of dynamic scheduling
- Multimedia broadcast/multicast service (MBMS) service identification
- Transport format selection
- Padding A physical layer (hereinafter, also referred to as a PHY layer) 1b-20 or 1b-25 may transform upper-layer data into OFDM symbols by means of channel coding and modulation and transmit the OFDM symbols via a radio channel, or perform demodulation and channel decoding on OFDM symbols received via a radio channel and transfer the demodulated and channel-decoded OFDM symbols to an upper layer.

Figure 1C:
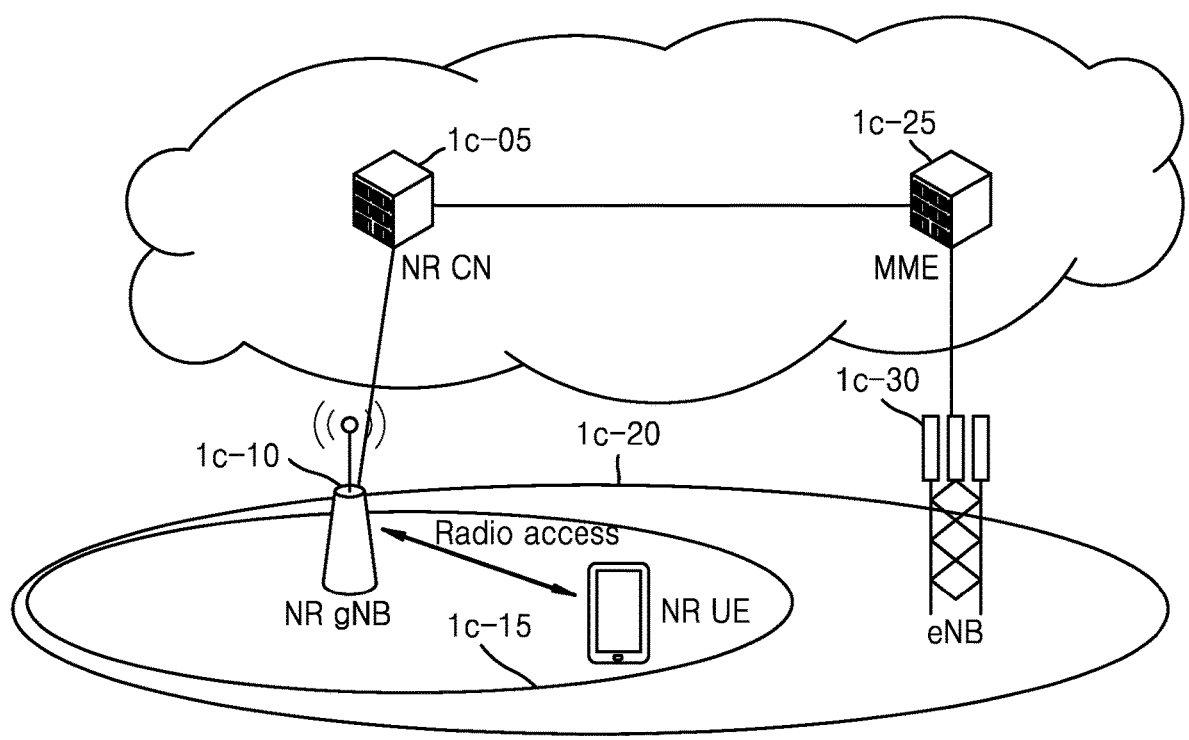
FIG. 1C illustrates a structure of a next-generation mobile communication system according to an embodiment of the present disclosure.

FIG. 1C illustrates a structure of a next-generation mobile communication system to which an embodiment is applied.

Referring to FIG. 1C, a radio access network for the next-generation mobile communication system consists of a next-generation base station, i.e., a new ratio node B (hereinafter, referred to as NR gNB or NR base station) 1c-10 and a NR core network (NR CN) 1c-05. A NR UE (or terminal) 1c-15 may connect to an external network via the NR gNB 1c-10 and the NR CN 1c-05.

In FIG. 1C, the NR NB 1c-10 corresponds to an eNB in the existing LTE system. The NR gNB 1c-10 may be connected to the NR UE 1c-15 via a radio channel and provide a higher level of service than the node B. In the next-generation mobile communication system, as all user traffic is served on shared channels, an entity is needed to perform scheduling by collecting status information such as buffer states, available transmit power states and channel states for UEs. The NR gNB 1c-10 may perform this scheduling function. In general, one NR gNB controls multiple cells. To provide ultra-high-speed data transfer as compared to current LTE, the next-generation mobile communication system may have bandwidths wider than the existing maximum bandwidth and utilize OFDM as a radio access technology in conjunction with an additional beamforming technique. Furthermore, the NR gNB 1c-10 may apply AMC to determine a modulation scheme and a channel coding rate according to a channel state for a UE. The NR CN 1c-05 may perform functions such as mobility support, bearer configuration, quality of service (QoS) configuration, etc. The NR CN 1c-05 is an entity responsible for performing various control functions as well as mobility management for a UE and is connected to multiple base stations. Furthermore, the next-generation mobile communication system may interwork with the existing LTE system, and the NR CN 1c-05 may be connected with a MME 1c-25 through a network interface. The MME 1c-25 may be connected to an eNB 1c-30 that is the existing base station.

Figure 1D:
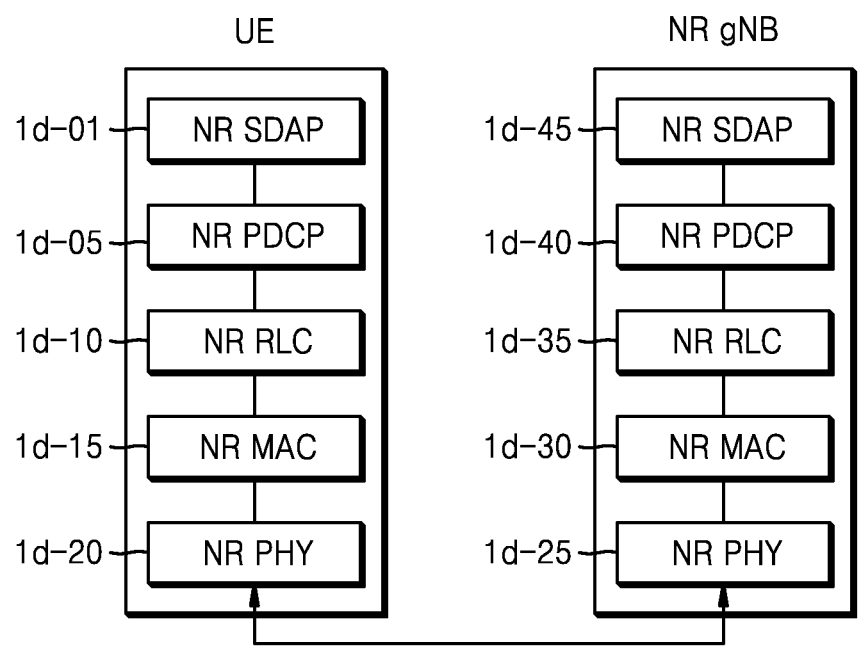
FIG. 1D illustrates a radio protocol architecture for a next-generation mobile communication system, according to an embodiment.

FIG. 1D illustrates a radio protocol architecture for a next-generation mobile communication system to which an embodiment is applied.

Referring to FIG. 1D, a radio protocol stack for each of a UE and an NR base station in the next-generation mobile communication system includes NR service data adaptation protocol (NR SDAP) 1d-01 or 1d-45, NR PDCP 1d-05 or 1d-40, NR RLC 1d-10 or 1d-35, and NR MAC 1d-15 or 1d-30.

Main functions of the NR SDAP 1d-01 or 1d-45 may include some of the following.
 Transfer of user plane data
 Mapping between a QoS flow and a data radio bearer (DRB) for both downlink and uplink
 Marking a QoS flow ID in both downlink and uplink packets
  Reflective QoS flow to DRB mapping for uplink SDAP PDUs For an SDAP layer apparatus, the UE may receive via a radio resource control (RRC) message a configuration as to whether to use a header of the SDAP layer or a function of the SDAP layer per PDCP layer apparatus, per bearer, or per logical channel. When an SDAP header is set, a 1-bit non-access stratum (NAS) reflective QoS indicator and a 1-bit AS reflective QoS indicator in the SDAP header may indicate that the UE may update or reconfigure information about mapping between a QoS flow and a DRB for uplink and downlink. The SDAP header may include QoS flow ID information identifying QoS. QoS information may be used as a priority for data processing, scheduling information, etc. to support a smooth service.

Main functions of the NR PDCP 1d-05 or 1d-40 may include some of the following functions.
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink In this case, the reordering function of an NR PDCP layer apparatus may include a function of sequentially reordering PDCP PDUs received from a lower layer based on a PDCP sequence number (SN) and a function of transferring data to an upper layer in a rearranged order. Alternatively, the reordering function of the NR PDCP layer apparatus may include at least one of a function of transferring data directly to an upper layer without taking an order into account, a function of sequentially reordering PDCP PDUs and recording missing PDCP PDUs, a function of submitting a status report for missing PDCP PDUs to a transmitting side, and a function of requesting retransmission of missing PDCP PDUs.

According to an embodiment of the disclosure, main functions of the NR RLC 1d-10 or 1d-35 may include some of the following.
 Transfer of upper layer PDUs
 In-sequence delivery of upper layer PDUs
 Out-of-sequence delivery of upper layer PDUs
 Error correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment In this case, the in-sequence delivery function of an NR RLC layer apparatus may refer to a function of sequentially transferring RLC SDUs received from a lower layer to an upper layer. The in-sequence delivery function may include at least one of a function of, when one RLC SDU is segmented into multiple RLC SDUs and received, reassembling and transmitting the multiple RLC SDUs.

Furthermore, the in-sequence delivery function of the NR RLC layer apparatus may include at least one of a function of reordering received RLC PDUs based on an RLC SN or a PDCP SN, a function of sequentially reordering RLC PDUs and recording missing RLC PDUs, a function of submitting a status report on the missing RLC PDUs to a transmitting side, and a function of requesting retransmission of the missing RLC PDUs. Furthermore, when there is a missing RLC SDU, the in-sequence delivery function the NR RLC layer apparatus may include a function of sequentially transferring only RLC SDUs preceding the missing RLC SDU to an upper layer.

In addition, even when there is a missing RLC SDU, the in-sequence delivery function the NR RLC layer apparatus may include at least one of a function of sequentially transferring all RLC SDUs received before a given timer restarts to an upper layer when the timer expires before the missing RLC SDU is received and a function of sequentially transferring, to the upper layer, all RLC SDUs received up to a current time point when the given timer expires before the missing RLC SDU is received. Furthermore, according to the out-of-sequence delivery function of the NR RLC layer apparatus, the NR RLC layer apparatus may process RLC PDUs in an order that the RLC PDUs are received (in an order of arrival regardless of the order of serial numbers or SNs) and transmit the RLC PDUs to a PDCP layer apparatus regardless of their order (out-of-sequence delivery). When segments are received, the NR RLC layer apparatus may receive segments stored in a buffer or segments to be subsequently received to reconfigure the segments into one complete RLC PDU and then process the RLC PDU for transmission to the PDCP layer apparatus. The NR RLC layer may not include a concatenation function, or the concatenation function may be performed at the NR MAC layer or be replaced with the multiplexing function of the NR MAC layer.

In this case, the out-of-sequence delivery function of the NR RLC layer apparatus may include a function of transferring RLC SDUs received from a lower layer directly to an upper layer regardless of their orders. When one RLC SDU is segmented into multiple RLC SDUs and received, the out-of-sequence delivery function may include at least one of a function of reassembling and transmitting the multiple RLC SDUs and a function of storing RLC SNs or PDCP SNs of received RLC PDUs, reordering the RLC PDUs, and recording missing RLC PDUs.

The NR MAC 1d-15 or 1d-30 may be connected to multiple NR RLC layer apparatuses configured in one UE. Main functions of the NR MAC 1d-15 or 1d-30 may include some of the following.

Mapping between logical channels and transport channels
Multiplexing/demultiplexing of the MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may transform upper-layer data into OFDM symbols by means of channel coding and modulation and transmit the OFDM symbols via a radio channel, or perform demodulation and channel decoding on OFDM symbols received via a radio channel and transfer the demodulated and channel-decoded OFDM symbols to an upper layer.

In the present disclosure, a procedure in which a UE compresses data during transmission via an uplink (UL) in a wireless communication system and a base station decompresses the compressed data is described. More specifically, there is provided a method for supporting a data transmission/reception procedure in which a transmitting side compresses and transmits data and a receiving side decompresses the compressed data, the method including a specific header format and a method of solving a decompression failure.

Furthermore, the technical features of the present disclosure may be applied to a procedure in which the base station compresses downlink data and transmits the compressed downlink data to the UE and the UE receives and decompresses the compressed downlink data.

As described above, in the present disclosure, by compressing and transmitting data at the transmitting side, more data may be transmitted and coverage may also be improved.

Figure 1E:
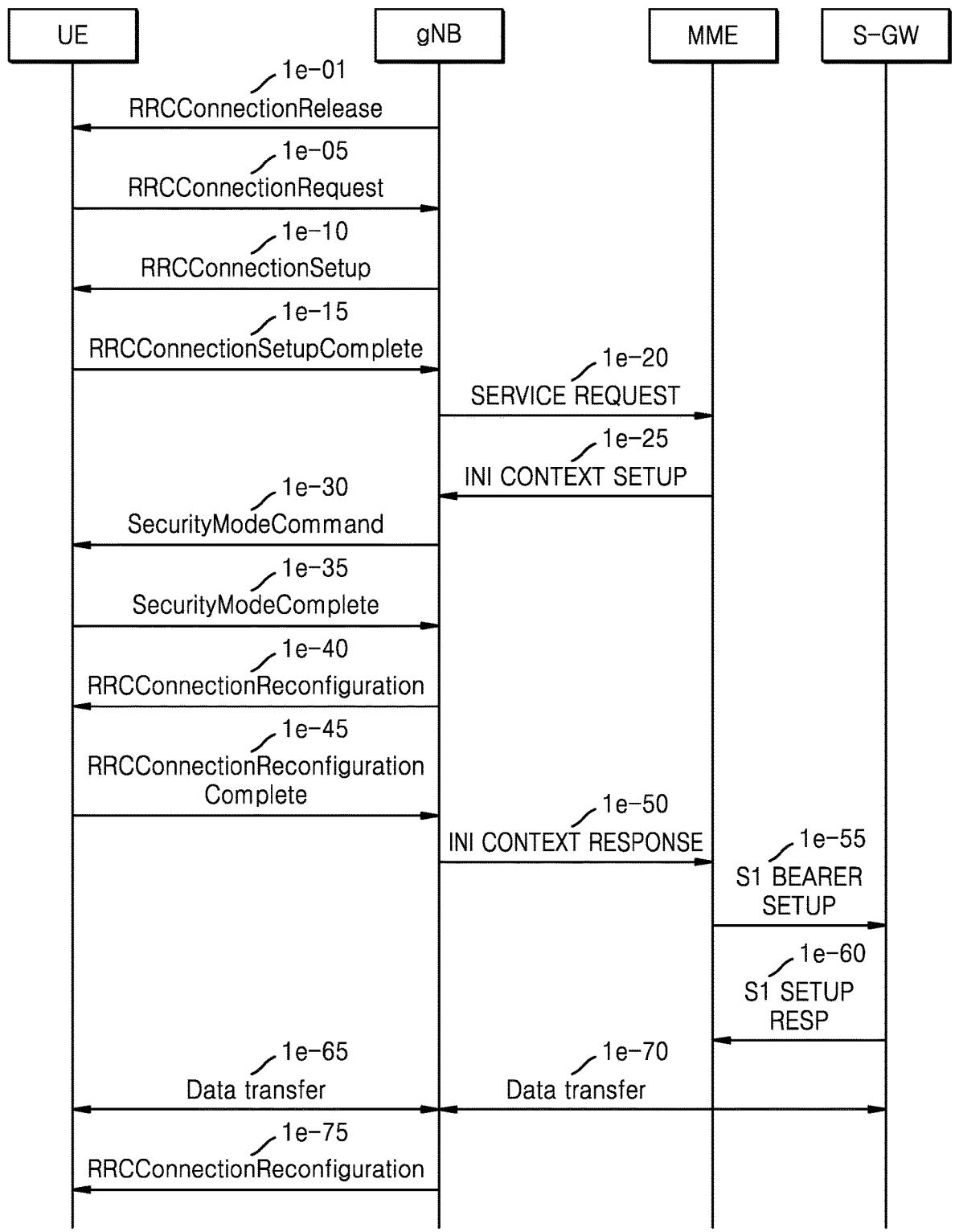
FIG. 1E is a diagram illustrating a procedure, performed by a base station, for indicating whether to perform uplink data compression (UDC) when a user equipment (UE) establishes a connection with a network, according to an embodiment.

FIG. 1E is a diagram illustrating a procedure, performed by a base station, for indicating whether to perform UL data compression (UDC) when a UE establishes a connection with a network, according to an embodiment. Hereinafter, UDC may be used in the same sense as user data compression or user compression procedure.

In more detail, FIG. 1E illustrates a procedure in which the UE switches from an RRC idle mode or RRC inactive (or lightly-connected) mode to an RRC connected mode and establishes a connection with a network and a procedure for indicating whether to perform UDC.

In operation 1e-01 of FIG. 1E, when the UE that transmits or receives data in the RRC connected mode does not transmit or receive data for a certain reason or for a certain time, a base station (gNB) may transmit an RRCConnection Release message to the UE such that the UE switches to the RRC idle mode. Thereafter, when the UE that has not established a connection with the gNB (hereinafter, referred to as an idle mode UE) has data to be transmitted, the idle mode UE performs an RRC connection establishment procedure with the gNB.

In operation 1e-05, the idle mode UE establishes reverse transmission synchronization with the gNB via a random access procedure and transmits an RRCConnectionRequest message to the gNB. The RRCConnection Request message may carry an identifier of the idle mode UE, establishment cause (establishmentCause), etc.

In operation 1e-10, the gNB transmits an RRCConnectionSetup message such that the idle mode UE establishes an RRC connection.

The RRCConnectionSetup message may include information indicating whether a UDC method is to be used for each logical channel (logicalchannelconfig), each bearer, or each PDCP layer (PDCP-config). In more detail, the RRC-Connection Setup message may indicate only which IP flow or QoS flow the UDC method is to be used for in each logical channel, each bearer, or each PDCP layer apparatus (or each SDAP layer apparatus) (the RRCConnectionSetup message may configure the SDAP layer apparatus with information about an IP flow or QoS flow for which the UDC method is to be used or is not to be used, and then the SDAP layer apparatus may indicate to the PDCP layer apparatus whether to use the UDC method for each QoS flow. Alternatively, the PDCP layer apparatus may autonomously check each QoS flow and determine whether to apply the UDC method thereto).

Furthermore, when use of the UDC method is indicated, the RRC ConnectionSetup message may indicate an identifier of a predefined library or dictionary that is to be used in the UDC method, a size of a buffer to be used in the UDC method, or the like. Furthermore, when the predefined library or dictionary is configured, a compression ratio of compressed data may be increased from that of initial compressed data since the configured predefined library or dictionary is used for an initial value or initial content of the buffer used for compression. In addition, the RRCConnectionSetup message may include a setup or release command for performing UL data decompression. When the use of the UDC method is configured, the gNB may always configure the UDC method by using an RLC AM bearer (a lossless mode due to an ARQ function or a retransmission function) and may not configure a header compression protocol (an ROHC protocol) together therewith.

The RRCConnectionSetup message may indicate whether a function of the SDAP layer apparatus is to be used or whether an SDAP header is to be used for each logical channel (logicalchannelconfig), each bearer, or each PDCP layer apparatus (PDCP-config). Furthermore, the RRCConnection Setup message may indicate whether ROHC (IP packet header compression) is to be applied for each logical channel (logicalchannelconfig), each bearer, or each PDCP layer apparatus (PDCP-config), and whether the ROHC is to be applied for UL or downlink (DL) may be configured via an indicator. However, the ROHC and the UDC may not be simultaneously configured for a PDCP layer apparatus, logical channel, or bearer, and the UDC may be configured for a maximum of two bearers but is not limited to the example.

Furthermore, the RRCConnection Setup message may indicate whether integrity verification (integrity protection) is to be applied for each logical channel (logicalchannelconfig), each bearer, or each PDCP layer apparatus (PDCP-config) by taking into account a maximum data transfer rate in a corresponding PDCP layer apparatus, bearer, or logical channel. The RRCConnectionSetup message may also carry RRC connection configuration information. The RRC connection may also be referred to as a signaling radio bearer (SRB) and used for transmitting or receiving an RRC message which is a control message between the UE and the gNB.

In operation 1e-15, the UE establishes the RRC connection with the gNB and then transmits an RRCConnetionSetupComplete message to the gNB.

When the gNB does not know or desires to identify capabilities of the UE that has established the connection therewith, the gNB may transmit a UE capability inquiry message. The UE may then transmit a UE capability report message. The UE capability report message may indicate whether the UE is capable of using the UDC method, ROHC, or integrity verification (integrity protection) and include an indicator indicating the same.

The RRCConnetionSetupComplete message may include a control message corresponding to a SERVICE REQUEST message used by the UE to request an MME to set up a bearer for a certain service.

In operation 1e-20, the gNB may transmit the SERVICE REQUEST message carried in the RRCConnetionSetupComplete message to the MME, and the MME may determine whether to provide the service requested by the UE.

In operation 1e-25, when the MME determines to provide the service requested by the UE, the MME may transmit an INITIAL CONTEXT SETUP REQUEST message to the gNB.

The INITIAL CONTEXT SETUP REQUEST message may include QoS information to be applied in configuring a data radio bearer (DRB), security related information (e.g., a security key, a security algorithm, etc.) to be applied to the DRB, etc.

In operations 1e-30 and 1e-35, the gNB may respectively exchange a SecurityModeCommand message and a SecurityModeComplete message with the UE so as to set up a security with the UE.

When the security setup is completed, in operation 1e-40, the gNB may transmit an RRCConnectionReconfiguration message to the UE.

The RRCConnection Reconfiguration message may include information indicating whether a UDC method is to be used for each logical channel (logicalchannelconfig), each bearer, or each PDCP layer (PDCP-config). In more detail, the RRCConnection Reconfiguration message may indicate only which IP flow or QoS flow the UDC method is to be used for in each logical channel, each bearer, or each PDCP layer apparatus (or each SDAP layer apparatus) (the RRCConnection Reconfiguration message may configure the SDAP layer apparatus with information about an IP flow or QoS flow for which the UDC method is to be used or is not to be used, and then the SDAP layer apparatus may indicate to the PDCP layer apparatus whether to use the UDC method for each QoS flow. Alternatively, the PDCP layer apparatus may autonomously check each QoS flow and determine whether to apply the UDC method thereto).

Furthermore, when use of the UDC method is indicated, the RRC ConnectionReconfiguration message may indicate an identifier of a predefined library or dictionary that is to be used in the UDC method, a size of a buffer to be used in the UDC method, or the like. Furthermore, when the predefined library or dictionary is configured, a compression ratio of compressed data may be increased from that of initial compressed data since the configured predefined library or dictionary is used for an initial value or initial content of the buffer used for compression.

In addition, the RRCConnection Reconfiguration message may include a setup or release command for performing UL data decompression. When the use of the UDC method is configured, the gNB may always configure the UDC method by using an RLC AM bearer (a lossless mode due to an ARQ function or a retransmission function) and may not configure a header compression protocol (an ROHC protocol) together therewith.

The RRCConnection Reconfiguration message may indicate whether a function of the SDAP layer apparatus is to be used or whether an SDAP header is to be used for each logical channel (logicalchannelconfig), each bearer, or each PDCP layer apparatus (PDCP-config). Furthermore, the RRCConnection Reconfiguration message may indicate whether ROHC (IP packet header compression) is to be applied for each logical channel (logicalchannelconfig), each bearer, or each PDCP layer apparatus (PDCP-config), and whether the ROHC is to be applied for UL or DL may be configured via an indicator. However, the ROHC and the UDC may not be simultaneously configured for a PDCP layer apparatus, logical channel, or bearer, and the UDC may be configured for a maximum of two bearers. However, this configuration is limited to the example.

Furthermore, the RRCConnection Reconfiguration message may indicate whether integrity verification (integrity protection) is to be applied for each logical channel (logicalchannelconfig), each bearer, or each PDCP layer apparatus (PDCP-config) by taking into account a maximum data transfer rate in a corresponding PDCP layer apparatus, bearer, or logical channel. The RRC ConnectionReconfiguration message may also include configuration information for the DRB for processing user data.

In operation 1e-45, the UE may configure the DRB by applying the configuration information and transmit an RRCConnection ReconfigurationComplete message to the gNB.

In operation 1e-50, the gNB that completed the DRB configuration with the UE may transmit an INITIAL CONTEXT SETUP COMPLETE message to the MME.

In operations 1e-55 and 1e-60, the MME that has received the INITIAL CONTEXT SETUP COMPLETE message may respectively exchange an S1 BEARER SETUP message and an S1 BEARER SETUP RESPONSE message with an S-GW in order to establish an S1 bearer with the S-GW.

In operations 1e-65 and 1e-70, the S1 bearer may be a connection for data transfer established between the S-GW and the gNB and correspond one-to-one with the DRB. When the above-described procedure is completed, the UE may transmit or receive data to or from the gNB via the S-GW.

As described above, a general data transfer procedure may consist mainly of three stages such as RRC connection setup, security setup, and DRB configuration.

In operation 1e-75, the gNB may transmit an RRCConnection Reconfiguration message in order to provide new configuration to the UE or add or change the configuration for a certain reason.

The RRCConnection Reconfiguration message may include information indicating whether the UDC method is to be used for each logical channel (logicalchannelconfig), each bearer, or each PDCP layer (PDCP-config). In more detail, the RRCConnection Reconfiguration message may indicate which IP flow or QoS flow the UDC method is to be used for in each logical channel, each bearer, or each PDCP layer apparatus (or each SDAP layer apparatus) (the RRCConnection Reconfiguration message may configure the SDAP layer apparatus with information about an IP flow or QoS flow for which the UDC method is to be used or is not to be used, and then the SDAP layer apparatus may indicate to the PDCP layer apparatus whether to use the UDC method for each QoS flow. Alternatively, the PDCP layer apparatus may autonomously check each QoS flow and determine whether to apply the UDC method thereto).

Furthermore, when use of the UDC method is indicated, the RRC ConnectionReconfiguration message may indicate an identifier of a predefined library or dictionary that is to be used in the UDC method, a size of a buffer to be used in the UDC method, or the like. Furthermore, when the predefined library or dictionary is configured, a compression ratio of compressed data may be increased from that of initial compressed data since the configured predefined library or dictionary is used for an initial value or initial content of the buffer used for compression.

The RRCConnection Reconfiguration message may include a setup or release command for performing UL data decompression. When the use of the UDC method is configured, the gNB may always configure the UDC method by using an RLC AM bearer (a lossless mode due to an ARQ function or a retransmission function) and may not configure a header compression protocol (an ROHC protocol) together therewith. Furthermore, the RRCConnection Reconfiguration message may indicate whether a function of the SDAP layer apparatus is to be used or whether an SDAP header is to be used for each logical channel (logicalchannelconfig), each bearer, or each PDCP layer apparatus (PDCP-config). Furthermore, the RRCConnection Reconfiguration message may indicate whether ROHC (IP packet header compression) is to be applied for each logical channel (logicalchannelconfig), each bearer, or each PDCP layer apparatus (PDCP-config), and whether the ROHC is to be applied for UL or DL may be configured via an indicator. However, the ROHC and the UDC may not be simultaneously configured for a PDCP layer apparatus, logical channel, or bearer, and the UDC may be configured for a maximum of two bearers. However, this configuration is limited to the example.

Furthermore, the RRCConnection Reconfiguration message may indicate whether integrity verification (integrity protection) is to be applied for each logical channel (logicalchannelconfig), each bearer, or each PDCP layer apparatus (PDCP-config) by taking into account a maximum data transfer rate in a corresponding PDCP layer apparatus, bearer, or logical channel.

Figure 1F:
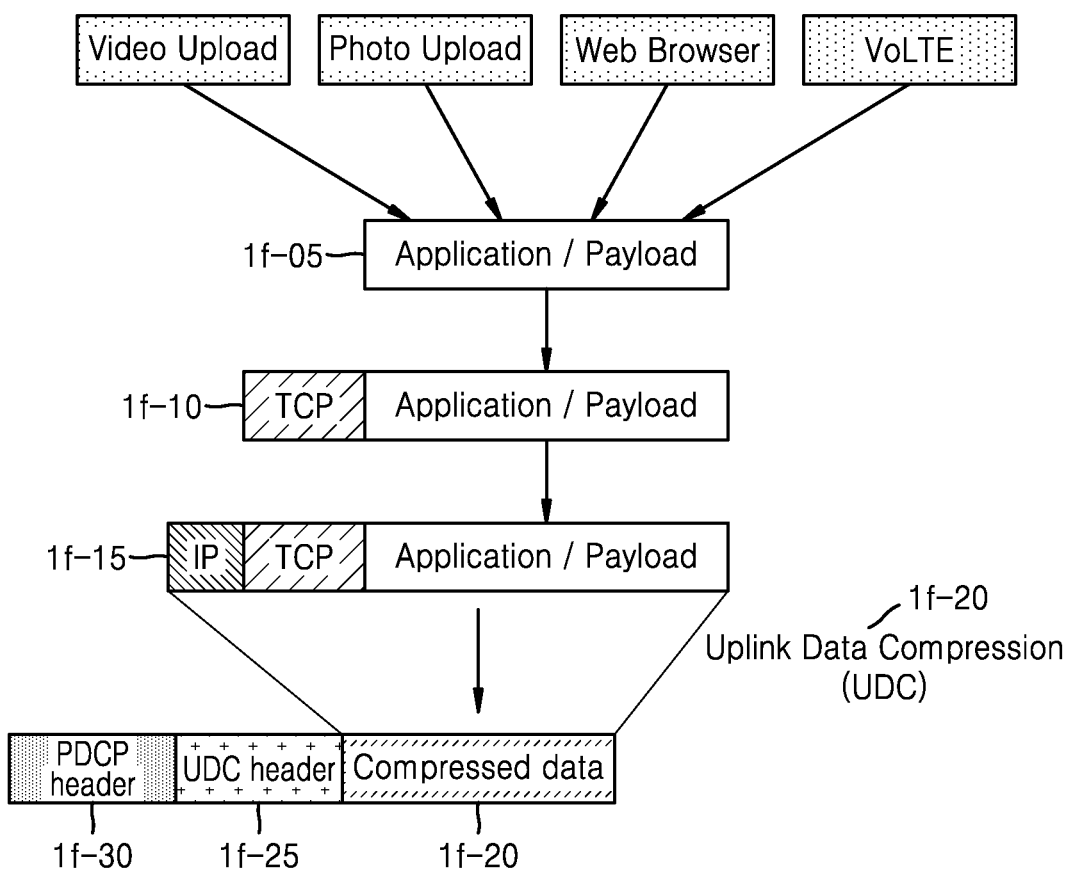
FIG. 1F is a diagram illustrating a procedure for performing UDC and a data structure associated therewith, according to an embodiment.

FIG. 1F is a diagram illustrating a procedure for performing UDC and a data structure associated therewith, according to an embodiment.

Referring to FIG. 1F, UL data 1f-05 may be generated as data corresponding to services such as video transmission, photo transmission, web browsing, voice over LTE (VoLTE), etc. Pieces of data generated in an application layer may be processed via a transmission control protocol (TCP)/IP or a user datagram protocol (UDP) corresponding to a network data transport layer to configure TCP and IP headers 1f-10 and 1f-15 and then may be transferred to a PDCP layer. Upon receipt of data (a PDCP SDU) from an upper layer, the PDCP layer may perform the following procedure.

When the PDCP layer is configured by an RRC message as in operation 1e-10, 1e-40, or 1e-75 of FIG. 1E to use a UDC method, the UE may perform UDC on the PDCP SDU as indicated by 1f-20 to compress UL data. Furthermore, the UE may configure a corresponding UDC header (a header for the compressed UL data) 1f-25, perform integrity protection when the integrity protection is configured, perform ciphering, and configure a PDCP header 1f-30 to thereby construct a PDCP PDU.

Each PDCP layer apparatus of the UE may include a UDC compressor/a UDC decompressor, determine whether to perform a UDC procedure on each data as configured in the RRC message, and use the UDC compressor/UDC decompressor. A transmitting side of a PDCP layer apparatus may perform data compression by using the UDC compressor while a receiving side of the PDCP layer apparatus may perform data decompression by using the UDC decompressor.

The procedure described with reference to FIG. 1F may be applied to compression of downlink data by the UE as well as compression of UL data by the UE. In addition, the descriptions with respect to UL data may be applied equally to downlink data.

Figure 1G:
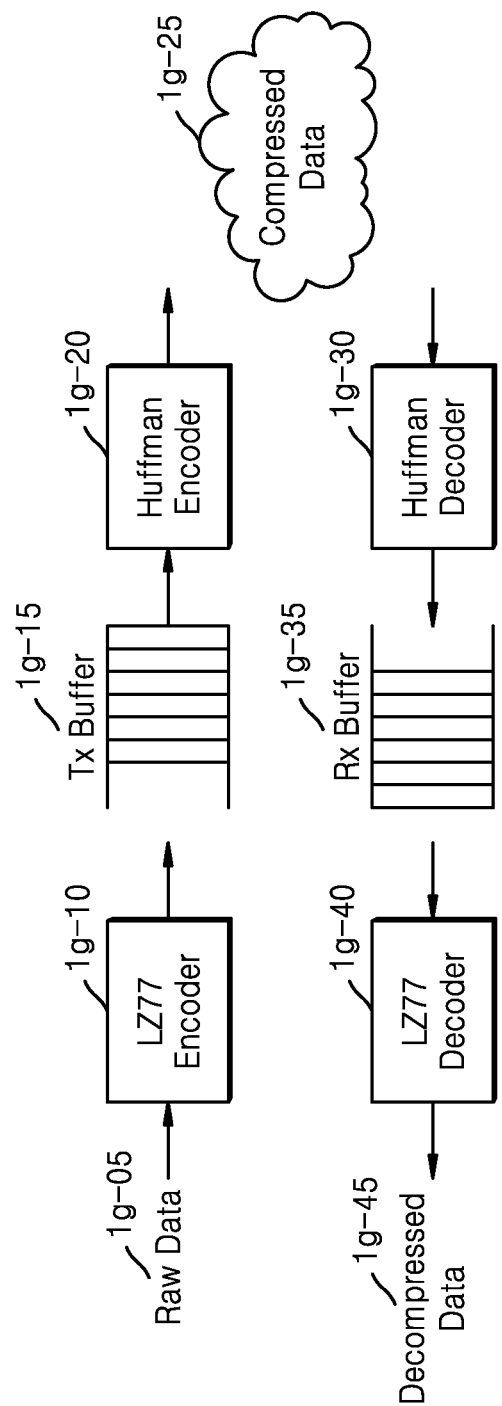
FIG. 1G is a diagram illustrating a UDC method according to an embodiment.

FIG. 1G is a diagram illustrating a UDC method according to an embodiment.

Referring to FIG. 1G, a UDC algorithm may be based on a DEFLATE data compression algorithm. A DEFLATE-based UDC algorithm is a lossless compression algorithm. The DEFLATE-based UDC algorithm may basically combine a Lempei-Ziv 77 (LZ77) algorithm with Huffman coding to compress UL data. The LZ77 algorithm may perform an operation of finding repeated sequences of data via a sliding window, and when a repeated sequence is found within the sliding window, perform data compression by expressing the repeated sequence as a position where the repeated sequence is found within the sliding window and a length that is the degree of repetition.

The sliding window is called a buffer in the UDC method and may be set to 8 kilobytes (kB) or 32 kB. In other words, the sliding window or the buffer may have a record of 8,192 or 32,768 characters and may be used to find a repeated sequence and perform data compression by representing the repeated sequence as a position and a length thereof.

Thus, because the LZ algorithm is a sliding window scheme, i.e., because subsequent data is encoded immediately after a buffer is updated with previously encoded data, successive pieces of data have a correlation therebetween. Thus, the subsequent data may be normally decoded only when the previously encoded data is normally decoded. Codes (expressions such as a position, a length, etc.)

obtained by compressing data by representing the data as a position and a length according to the LZ77 algorithm may be further compressed using Huffman coding. The Huffman coding may perform further compression by finding repeated codes and then assigning shorter codewords to more frequently used codes and longer codewords to less frequently used codes. The Huffman coding is prefix coding and thus is an optimal coding scheme in which all codes are uniquely decodable.

As described above, a transmitting side may encode raw data 1g-05 by applying the LZ77 algorithm (1g-10), update a buffer (1g-15), and generate checksum bits for content (or data) of the buffer to include them in a UDC header. The checksum bits may be used at the receiving side to determine validity of a buffer state.

The codes obtained by encoding with the LZ77 algorithm may further be compressed with the Huffman coding and then transmitted as UL data (1g-25). A receiving side performs a decompression procedure on the received compressed data in a reverse manner to the compression at the transmitting side. In other words, Huffman decoding is performed on the compressed data (1g-30), updates a buffer (1g-35), and checks validity of the updated buffer by using the checksum bits in the UDC header. When it is determined that the checksum bits do not detect errors, data may be decompressed by performing decoding with an LZ77 algorithm (1g-40) to reconstruct the raw data and then the reconstructed raw data may be transferred to an upper layer (1g-45).

As described above, because the LZ algorithm is a sliding window scheme, i.e., because subsequent data is encoded immediately after a buffer is updated with previously encoded data, successive pieces of data have a correlation therebetween. Thus, the subsequent data may be normally decoded only when the previously encoded data is normally decoded Thus, by checking PDCP sequence numbers in a PDCP header and then a UDC header (an indicator indicating whether data compression is or not performed), a receiving side of a PDCP layer apparatus may perform a data decompression procedure on pieces of data to which the data compression has been applied in an ascending order of the PDCP sequence numbers.

Figure 1H:
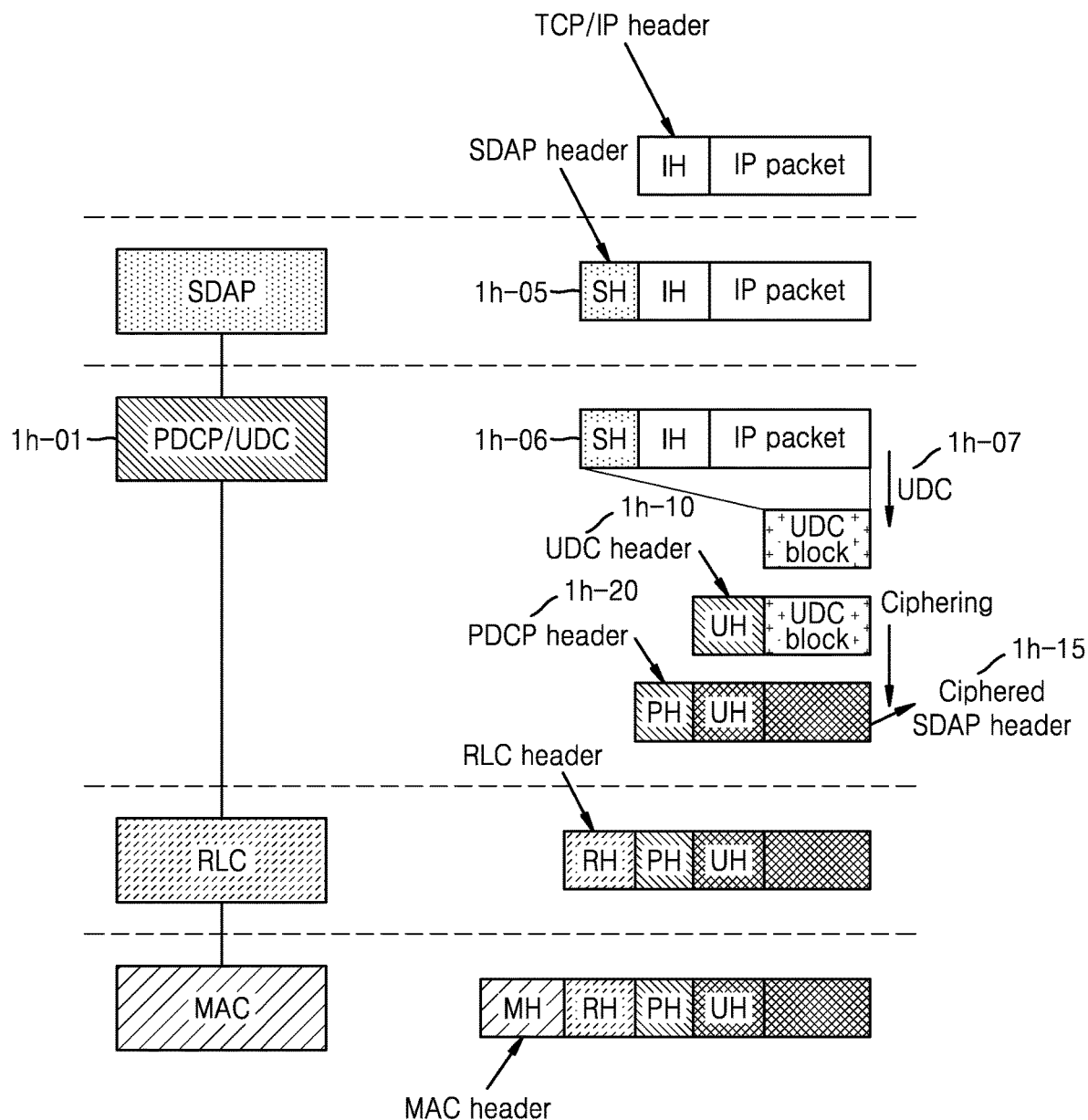
FIG. 1H is a diagram for explaining a method by which a service data adaptation protocol (SDAP) layer apparatus generates an SDAP header for data received from an upper layer, and a packet data convergence protocol (PDCP) layer apparatus applies UDC to the SDAP header, according to an embodiment.

FIG. 1H is a diagram for explaining a method by which an SDAP layer apparatus generates an SDAP header for data received from an upper layer, and a PDCP layer apparatus applies UDC to the SDAP header, according to an embodiment.

Referring to FIG. 1H, in at least one of a case wherein use of a function of an SDAP layer apparatus or use of an SDAP header is configured by an RRC message as in operation 1e-10, 1e-40, or 1e-75 of FIG. 1E and a case wherein UDC is configured by the RRC message, upon receipt of data from an upper layer, the SDAP layer apparatus may generate and configure an SDAP header as indicated by 1h-05 and transfer the SDAP header to the PDCP layer apparatus.

The PDCP layer apparatus may perform UDC on a PDCP SDU 1h-06 (including the SDAP header and an IP packet) received from the upper SDAP layer apparatus (1h-07). Then, the PDCP layer apparatus may calculate a checksum field, configure whether to apply the UDC to generate a UDC header, and prepend the UDC header to a UDC block (1h-10). Subsequently, the PDCP layer apparatus may perform ciphering on the UDC header and the compressed UDC block to generate, configure, and attach a PDCP header 1h-20 and then transfer data to a lower layer such that an RLC layer apparatus and a MAC layer apparatus may process the data.

Referring to FIG. 1H, the UDC procedure may be applied to the SDAP header. However, when the UDC is applied to the SDAP header as described above, the SDAP header may be ciphered because the ciphering is applied to the compressed UDC block. As described with reference to FIG. 1G, when UDC is applied to an SDAP header, it is understood that the SDAP header is put into a buffer used for the UDC as an input value, compared with a previous bitstream, and compressed when the data to be compressed is put into the buffer as an input value, compared with a bitstream of the previous data, and compressed.

Figure 1I:
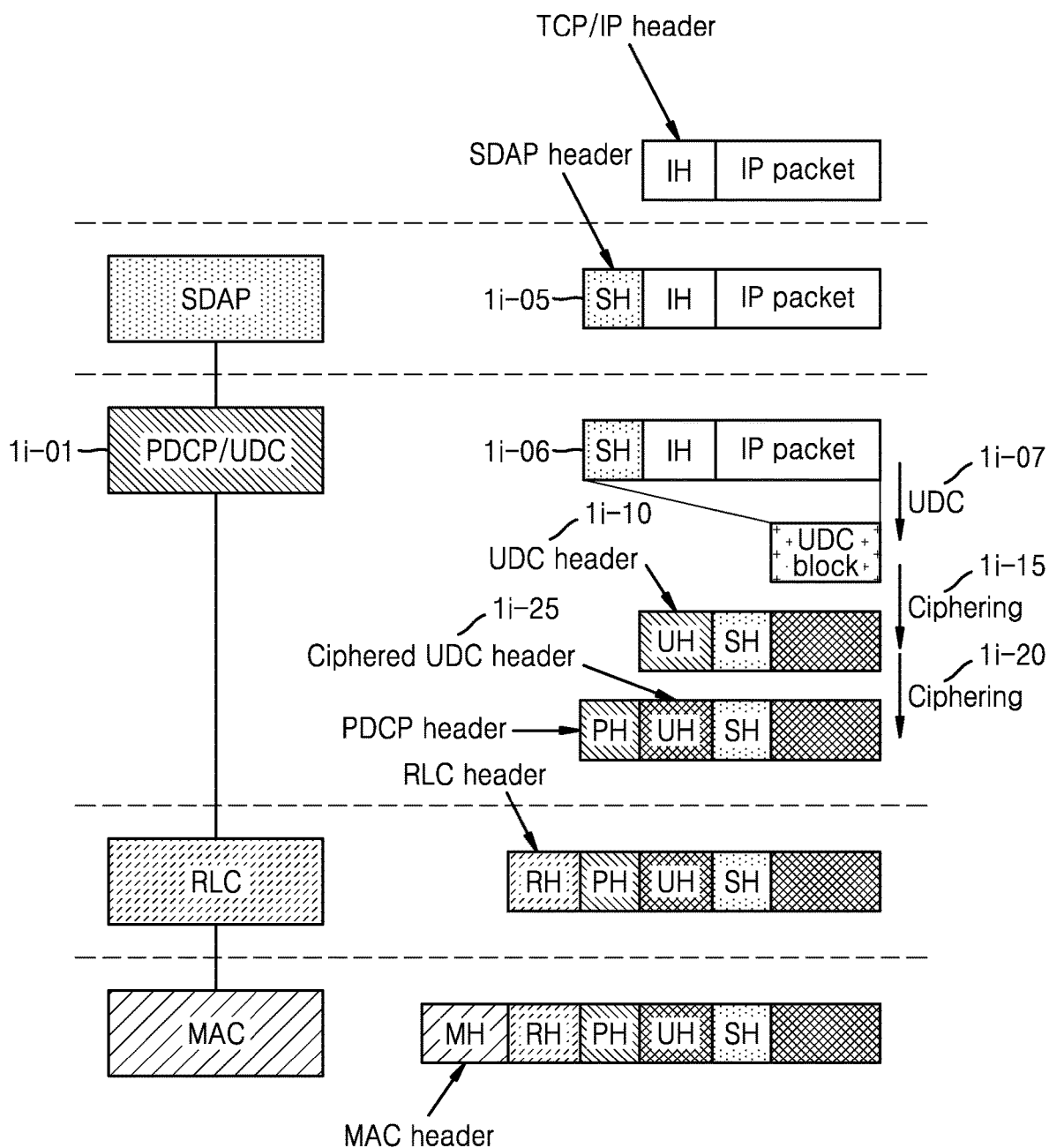
FIG. 1I is a diagram for explaining a method by which an SDAP layer apparatus generates an SDAP header for data received from an upper layer, and a PDCP layer apparatus does not apply UDC to the SDAP header, according to another embodiment.

FIG. 1I is a diagram for explaining a method by which an SDAP layer apparatus generates an SDAP header for data received from an upper layer, and a PDCP layer apparatus does not apply UDC to the SDAP header, according to another embodiment.

Referring to FIG. 1I, in at least one of a case wherein use of a function of an SDAP layer apparatus or use of an SDAP header is configured by an RRC message as in operation 1e-10, 1e-40, or 1e-75 of FIG. 1E and a case wherein UDC is configured by the RRC message, upon receipt of data from an upper layer, the SDAP layer apparatus may generate and configure an SDAP header as indicated by 1i-05 and transfer data to the PDCP layer apparatus.

The PDCP layer apparatus may perform UDC on the remaining part, other than the SDAP header, of a PDCP SDU 1i-06 (the SDAP header and an IP packet) received from the upper SDAP layer apparatus (1i-07). Then, the PDCP layer apparatus may calculate a checksum field and configure whether to apply the UDC to generate and prepend a UDC header (1i-10). Furthermore, when integrity protection is configured, the PDCP layer apparatus may first apply the integrity protection to the UDC header and a compressed UDC block before performing ciphering and then perform the ciphering separately on the compressed UDC block and the UDC header (1i-15 and 1i-20).

In an embodiment, in order to perform ciphering only once, the PDCP layer apparatus may perform the ciphering with respect to the UDC header and the UDC block at once by removing or excluding the SDAP header in the middle. The PDCP layer apparatus may configure data by inserting again an unciphered SDAP header between the UDC header and the UDC block. Furthermore, the PDCP layer apparatus may generate, configure, and attach a PDCP header (1i-20) and then transfer data to a lower layer such that an RLC layer apparatus and an MAC layer apparatus may process the data.

Alternatively, the PDCP layer apparatus may perform the ciphering twice by respectively performing ciphering procedures on the UDC header and the UDC block. When the ciphering is performed separately on the UDC header and the data (UDC block), the risk of being hacked may be effectively reduced and security may be increased even if a data processing procedure becomes complicated. Thus, according to the embodiment, the security may be enhanced.

According to the procedure described with reference to FIG. 1I, the UDC procedure may not be applied to the SDAP header. When UDC is not applied to an SDAP header, it is understood that the SDAP header is not put into a buffer used for the UDC as an input value and not compressed while data to be compressed is put into the buffer as an input value, compared with a bitstream of the previous data, and compressed.

Figure 1J:
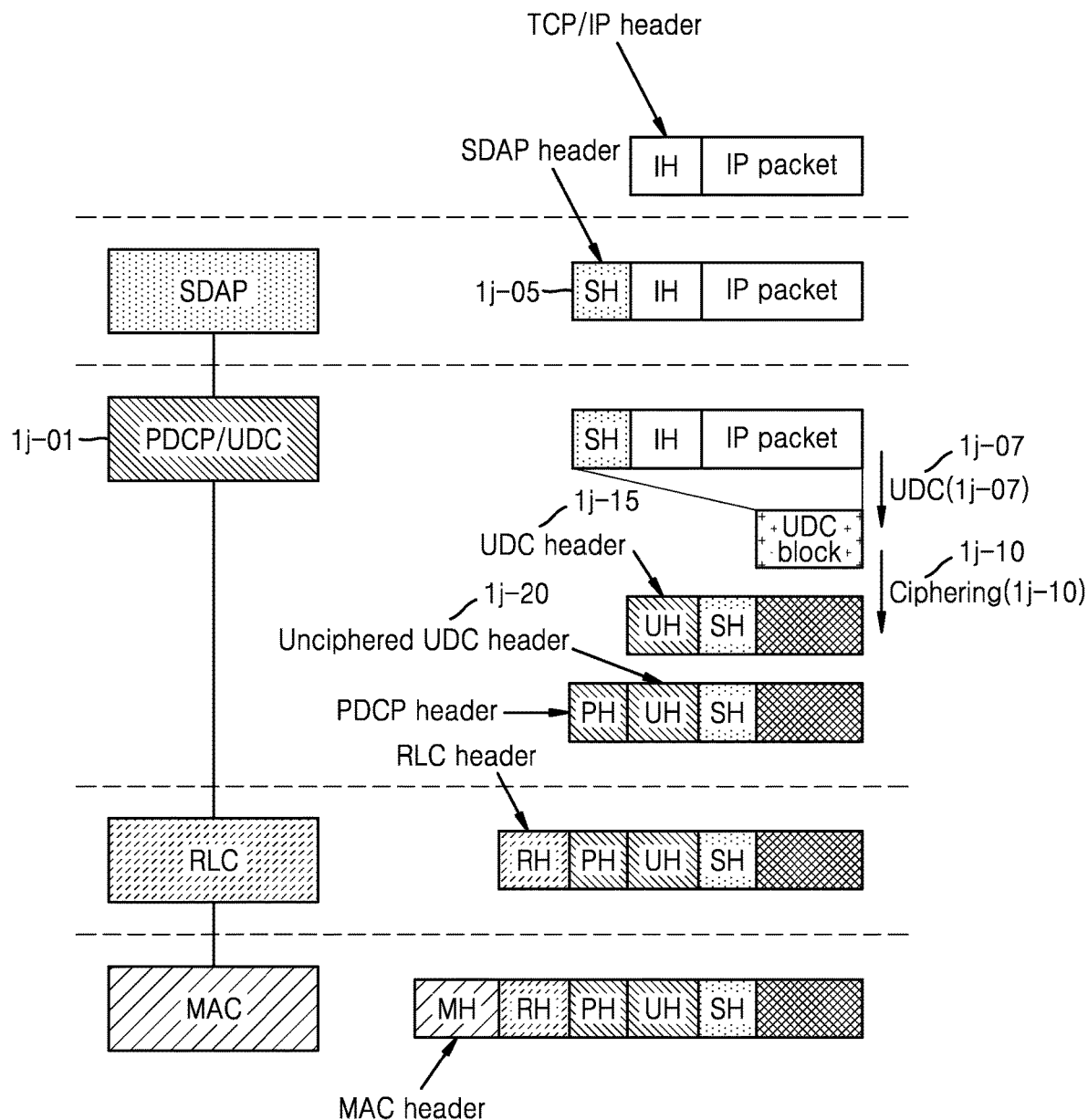
FIG. 1J is a diagram for explaining a method by which an SDAP layer apparatus generates an SDAP header for data received from an upper layer, and a PDCP layer apparatus does not apply UDC to the SDAP header and ciphering to a UDC header, according to another embodiment.

FIG. 1J is a diagram for explaining a method by which an SDAP layer apparatus generates an SDAP header for data received from an upper layer, and a PDCP layer apparatus does not apply UDC to the SDAP header and ciphering to a UDC header, according to another embodiment.

Referring to FIG. 1*j*, in at least one of a case wherein use of a function of an SDAP layer apparatus or use of an SDAP header is configured by an RRC message as in operation 1*e*-10, 1*e*-40, or 1*e*-75 of FIG. 1E and a case wherein UDC is configured by the RRC message, upon receipt of data from an upper layer, the SDAP layer apparatus may generate and configure an SDAP header as indicated by 1*j*-05 and transfer data to the PDCP layer apparatus.

The PDCP layer apparatus may perform UDC on the remaining part, other than the SDAP header, of a PDCP SDU 1*j*-06 (the SDAP header and an IP packet) received from the upper SDAP layer apparatus (1*j*-07). Furthermore, when integrity protection is configured, the PDCP layer apparatus may apply the integrity protection to a UDC block compressed with the UDC before performing ciphering. In other words, the PDCP layer apparatus may not apply the integrity protection to a UDC header and the SDAP header.

The PDCP layer apparatus may apply ciphering to the UDC block compressed with the UDC (1*j*-10). Furthermore, the PDCP layer apparatus may calculate a checksum field and configure whether to apply the UDC to generate and prepend the UDC header (1*j*-15 and 1*j*-20). In addition, the PDCP layer apparatus may generate, configure, and attach a PDCP header and then transfer data to a lower layer such that an RLC layer apparatus and an MAC layer apparatus may process the data.

When UDC header is not applied to an SDAP header and ciphering is not applied to the UDC header as described above, the UDC, ciphering, or decoding procedures may be simplified in implementation of a UE and a base station, processing involved in the implementation may be simplified and the burden of the processing may be reduced by eliminating complicated procedures.

According to the procedure described with reference to FIG. 1*j*, the UDC procedure may not be applied to the SDAP header, and the ciphering may not be performed on the UDC header. Furthermore, integrity protection may not be applied to both the UDC header and SDAP header, and the ciphering may not be performed thereon. When the PDCP layer apparatus does not perform the ciphering on the UDC header, the PDCP layer apparatus may first read and calculate a checksum field in the UDC header to check validity of content of a UDC buffer before the receiving side performs deciphering. Thus, when a checksum failure occurs, the PDCP layer apparatus may immediately discard corresponding data and process the checksum failure without performing the deciphering, such that the processing burden on the UE may be reduced.

Referring to FIG. 1E, UDC is performed in consideration of an SDAP header according to configuration information configured by the gNB according to an embodiment to the UE via an RRC message.

The UE according to an embodiment performs UDC by taking into account an SDAP header according to RRC configuration information.

When the SDAP header is not configured in the RRC configuration information but the UDC is configured therein, the UE may perform the UDC according to the embodiment described with reference to FIG. 1H. Because the SDAP header is not configured, the SDAP header does not exist when performing the procedure according to the embodiment described with reference to FIG. 1H, and a user compression procedure may be performed according to the procedure of the embodiment described with reference to FIG. 1H. As another method, the SDAP header may not exist when performing the procedure according to the embodiment described with reference to FIG. 1H, and the user compression procedure may be performed according to the procedure of the embodiment described with reference to FIG. 1H, but ciphering may not be performed on a UDC header such that the receiving side may immediately check a checksum field.

When the SDAP header and the UDC are configured in the RRC configuration information but a pre-defined library or dictionary is not configured therein, the UE may perform the UDC according to the embodiment of the present disclosure described with reference to FIG. 1H, 1I, or 1J.

However, when the SDAP header, the UDC, and the predefined library or dictionary are all configured in the RRC configuration information, the UE may perform the UDC according to the embodiment described with reference to FIG. 1I or 1J.

In the present disclosure, when the predefined library or dictionary is configured, the reason that the SDAP header is not put into a UDC buffer as an input value and not compressed is because the predefined library or dictionary includes a well-known repetitive structure of data from a higher layer than the SDAP layer, so if the SDAP header is put into the UDC buffer as an input value, compression efficiency may be degraded.

Another embodiment of the present disclosure in which the UE performs UDC in consideration of an SDAP header according to RRC configuration information is as follows.

When the SDAP header is not configured in the RRC configuration information but the UDC is configured therein, the UE may perform the UDC according to the embodiment described with reference to FIG. 1H. Because the SDAP header is not configured, the SDAP header does not exist when performing the procedure according to the embodiment described with reference to FIG. 1H, and a user compression procedure may be performed according to the procedure of the embodiment described with reference to FIG. 1H. As another method, the SDAP header may not exist when performing the procedure according to the embodiment described with reference to FIG. 1H, and the user compression procedure may be performed according to the procedure of the embodiment described with reference to FIG. 1H, but ciphering may not be performed on a UDC header such that the receiving side may immediately check a checksum field.

When the SDAP header and the UDC are configured in the RRC configuration information but a pre-defined library or dictionary is not configured therein, the UE may perform the UDC according to the embodiment of the present disclosure described with reference to FIG. 1H.

However, when the SDAP header, the UDC, and the predefined library or dictionary are all configured in the RRC configuration information, the UE may perform the UDC according to the embodiment of the present disclosure described with reference to FIG. 1I or 1J.

In the present disclosure, when the predefined library or dictionary is configured, the reason that the SDAP header is not put into a UDC buffer as an input value and not compressed is because the predefined library or dictionary includes a well-known repetitive structure of data from a higher layer than the SDAP layer, so if the SDAP header is put into the UDC buffer as an input value, compression efficiency may be degraded.

An example of specific operations of the UE according to the embodiment may be as follows:
  RRC connection setup
  RRCReconfiguration
  DRB/PDCP configuration Configuring whether to use UL SDAP header for each PDCP entity Configuring whether to apply UDC for each PDCP entity Configuring whether to use predefined directory Arrival of PDCP SDU at PDCP entity If SDAP header is configured and predefined directory is used, performing user compression procedure by putting the remaining part of the PDCU SDU other than 1 byte (SDAP header) into UDC buffer, applying ciphering and integrity check to compressed packet, and attaching to the compressed packet the PDCP basic header/UDC header (additional header (FU bit, FR bit, and checksum field))/1-byte SDAP header for transmission.

If the SDAP header is not configured, or if the SDAP header is configured but predefined directory is not used, performing user compression procedure by putting the entire PDCU SDU (including the SDAP header, if any) into UDC buffer, applying ciphering and integrity check to compressed packet, and attach to the compressed packet the PDCP basic header/UDC header (additional header (FU bit, FR bit, and checksum field)) for transmission.

As described above, in the procedure, the UE may perform ciphering on the UDC header in order to enhance security.

Figure 1K:
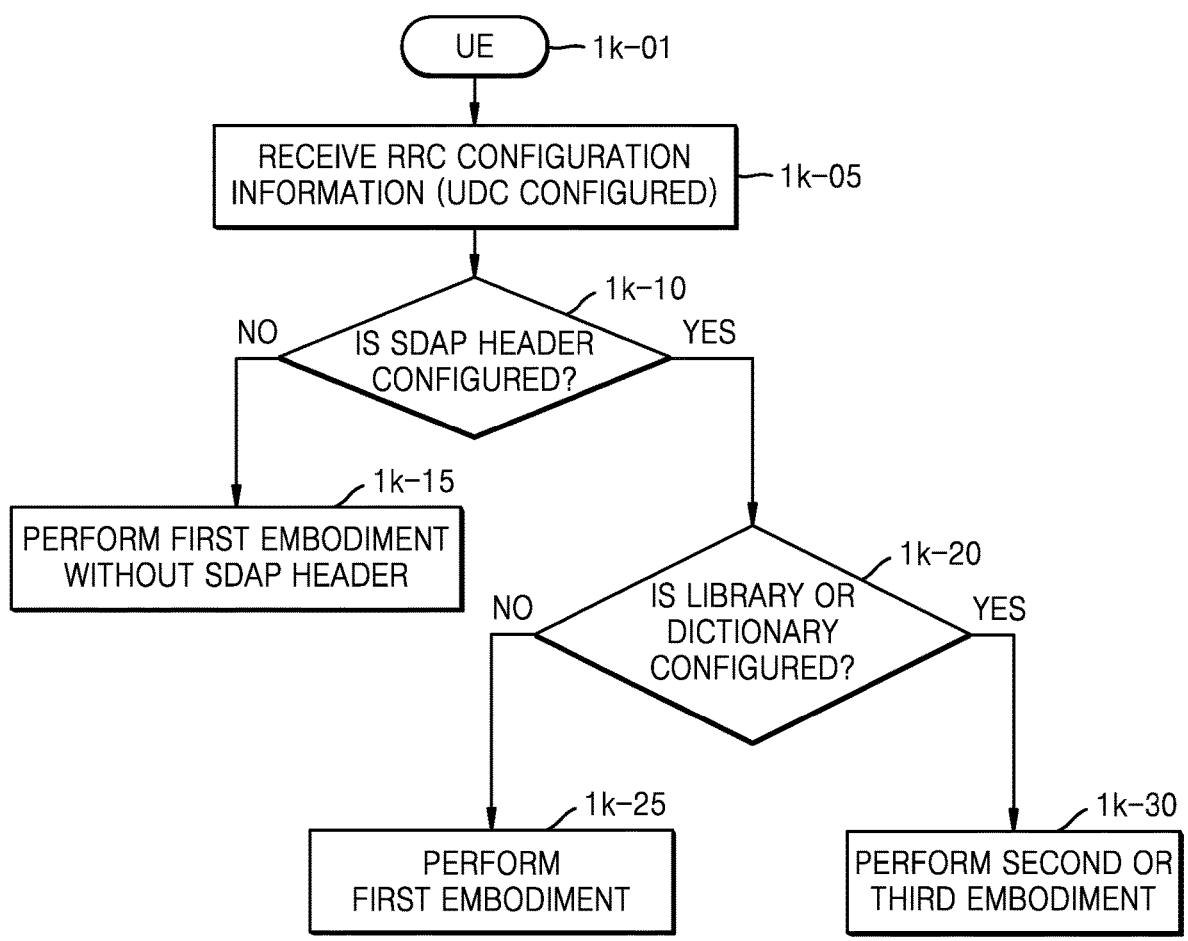
FIG. 1K is a diagram illustrating operations of a UE according to an embodiment.

FIG. 1K is a diagram illustrating operations of a UE according to an embodiment.

In operation 1k-05, a UE 1k-01 may receive RRC configuration information from a base station when establishing a connection with a network as shown in FIG. 1E.

In operation 1k-10, when an SDAP header is not configured in the RRC configuration information but the UDC is configured therein, the UE may perform the UDC according to the embodiment described with reference to FIG. 1H.

In operation 1k-15, because the SDAP header is not configured, the SDAP header does not exist when performing the procedure according to the embodiment described with reference to FIG. 1H, and a user compression procedure may be performed according to the procedure of the embodiment described with reference to FIG. 1H.

As another method, the SDAP header may not exist when performing the procedure according to the embodiment described with reference to FIG. 1H, and the user compression procedure may be performed according to the procedure of the embodiment described with reference to FIG. 1H, but ciphering may not be performed on a UDC header such that the receiving side may immediately check a checksum field.

When the SDAP header and the UDC are configured in the RRC configuration information in operation 1k-10, it is determined whether a predefined library or dictionary is configured in operation 1k-20.

When the predefined library or dictionary is not configured, the UE may perform the UDC according to the embodiment of the present disclosure described with reference to FIG. 1H in operation 1k-25.

However, when the SDAP header, the UDC, and the predefined library or dictionary are all configured in the RRC configuration information, the UE may perform the UDC according to the embodiment described with reference to FIG. 1I or 1J in operation 1k-30.

Figure 1L:
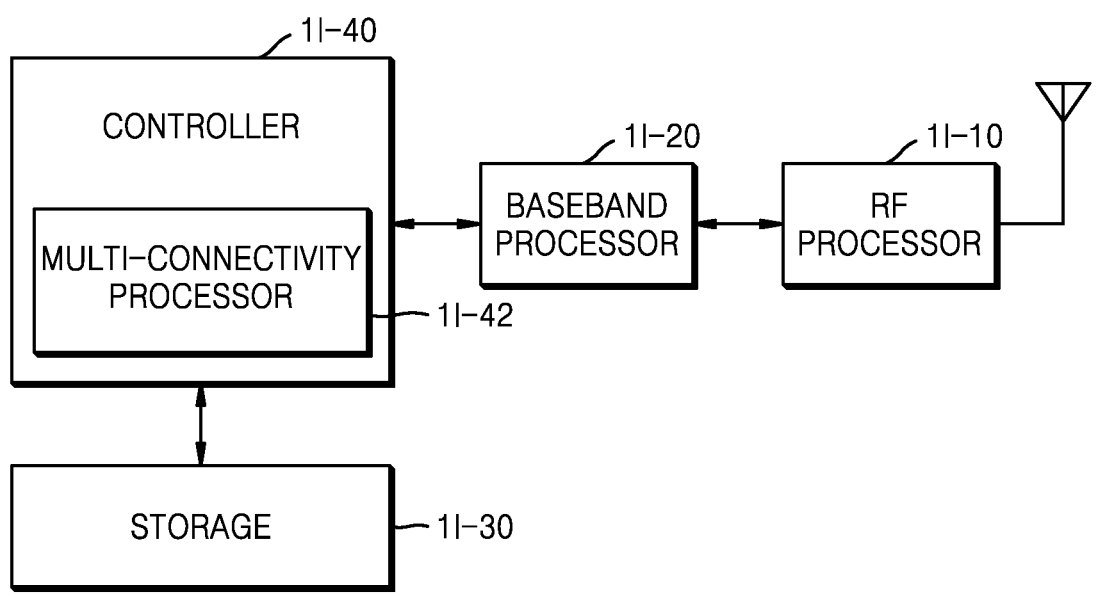
FIG. 1L is a block diagram of a configuration of a UE according to an embodiment.

FIG. 1L is a block diagram of a configuration of a UE according to an embodiment.

Referring to 1L, the UE includes a radio frequency (RF) processor 1*l*-10, a baseband processor 1*l*-20, a storage 1*l*-30, and a controller 1*l*-40.

The RF processor 1*l*-10 may perform a function for transmitting and receiving a signal via a radio channel, such as signal conversion between bands and amplification. In other words, the RF processor 1*l*-10 may up-convert a baseband signal provided by the baseband processor 1*l*-20 into an RF signal, transmit the RF signal via an antenna, and down-convert the RF signal received via the antenna into a baseband signal. For example, the RF processor 1*l*-10 may include a transmit filter, a receive filter, an amplifier, a mixer, an oscillator, a digital-to-analog converter (DAC), and an analog-to-digital converter (ADC). Although only a single antenna is shown in FIG. 1L, the UE may include a plurality of antennas. The RF processor 1*l*-10 may also include a plurality of RF chains. Furthermore, the RF processor 1*l*-10 may perform beamforming. For beamforming, the RF processor 1*l*-10 may adjust a phase and a magnitude of each of the signals transmitted or received via a plurality of antennas or antenna elements. The RF processor 1*l*-10 may also perform a multiple input multiple output (MIMO) operation during which multiple layers may be received. According to control by the controller 1*l*-40, the RF processor 1*l*-10 may perform receive beam sweeping by appropriately configuring multiple antennas or antenna elements or adjust a direction and a width of a receive beam such that the receive beam is aligned with a transmit beam.

The baseband processor 1*l*-20 may perform a function of converting between a baseband signal and a bitstream according to a physical layer specification of a system. For example, for data transmission, the baseband processor 1*l*-20 may generate complex symbols by encoding and modulating a transmit bitstream. For data reception, the baseband processor 1*l*-20 may reconstruct a receive bitstream by demodulating and decoding a baseband signal provided by the RF processor 1*l*-10. For example, according to an OFDM scheme, in data transmission, the baseband processor 1*l*-20 may generate complex symbols by encoding and modulating a transmit bitstream, map the complex symbols to subcarriers, and then construct OFDM symbols by performing an inverse fast Fourier transform (IFFT) operation and cyclic prefix (CP) insertion. Furthermore, in data reception, the baseband processor 1*l*-20 may divide a baseband signal provided by the RF processor 1*l*-10 into OFDM symbols, reconstruct signals mapped to subcarriers by performing an FFT operation, and then reconstruct a receive bitstream via demodulation and decoding.

The baseband processor 1*l*-20 and the RF processor 1*l*-10 transmit and receive signals as described above. Thus, the baseband processor 1*l*-20 and the RF processor 1*l*-10 may also be referred to as a transmitter, a receiver, a transceiver, or a communicator. Furthermore, at least one of the baseband processor 1*l*-20 and the RF processor 1*l*-10 may include multiple communication modules to support multiple different radio access technologies. Furthermore, at least one of the baseband processor 1*l*-20 and the RF processor 1*l*-10 may include different communication modules to process signals in different frequency bands. For example, the different radio access technologies may include an LTE network, NR network, etc. In addition, the different frequency bands may include a super-high frequency (SHF) band (e.g., 2.5 GHz and 5 GHz) bands and a millimeter-wave (mmWave) band (e.g., 60 GHz). The UE may transmit or receive a signal to or from a base station via the baseband processor 1*l*-20 and the RF processor 1*l*-10. In this case, the signal may include control information and data.

The storage 1*l*-30 may store basic programs, application programs, and data such as configuration information for operations of the UE. The storage 1*l*-30 provides stored data at the request of the controller 1*l*-40. The storage 1*l*-30 may be configured as storage media, such as read-only memory (ROM), random access memory (RAM), hard discs, compact disc (CD)-ROM, and digital versatile discs (DVDs), or a combination thereof. Furthermore, the storage 1*l*-30 may include a plurality of memories. In an embodiment, the storage 1*l*-30 may store a program for supporting beam-based cooperative communication.

The controller 1*l*-40 controls all operations of the UE. For example, the controller 1*l*-40 may transmit and receive signals via the baseband processor 1*l*-20 and the RF processor 1*l*-10. The controller 1*l*-40 may also write and read data to and from the storage 1*l*-30. To do so, the controller 1I-40 may include at least one processor. For example, the controller 1*l*-40 may include a communication processor (CP) for controlling communication and an application processor (AP) for controlling an upper layer such as an application program.

Figure 1M:
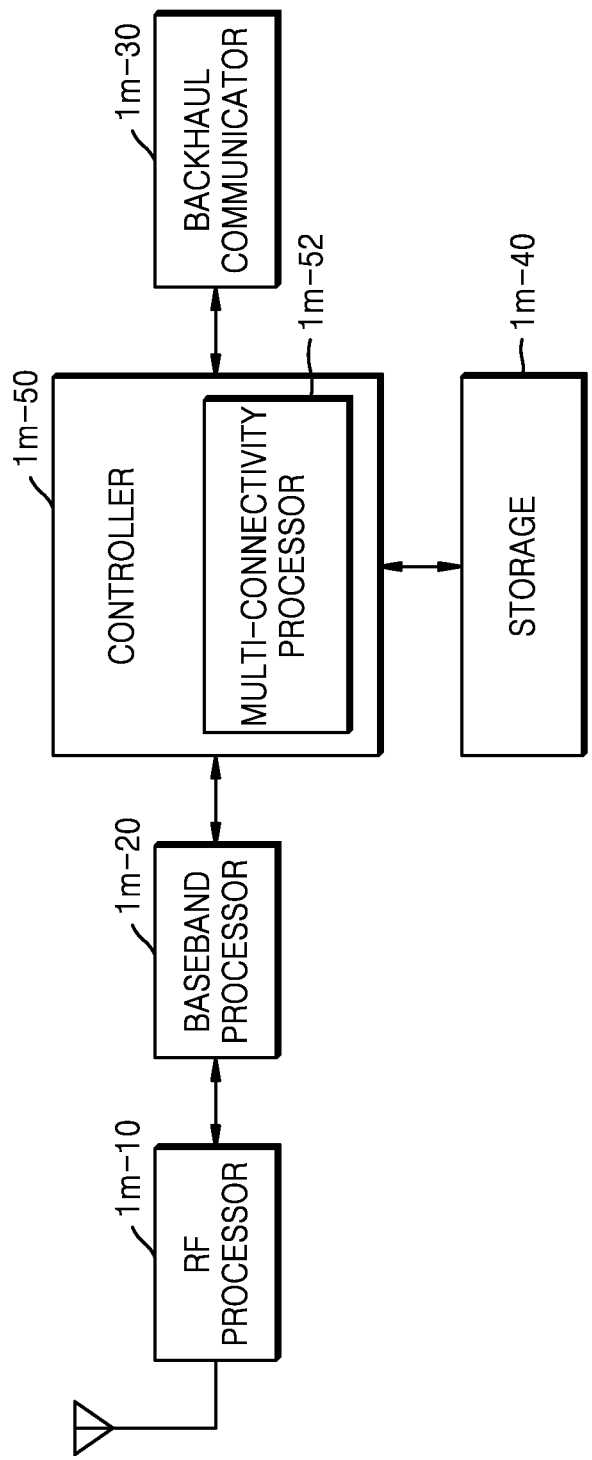
FIG. 1M is a block diagram of a configuration of a transmission reception point (TRP) in a wireless communication system to which an embodiment is applied.

FIG. 1M is a block diagram of a configuration of a transmission reception point (TRP) in a wireless communication system to which an embodiment is applied.

Referring to FIG. 1M, a base station may include an RF processor 1*m*-10, a baseband processor 1*m*-20, a backhaul communicator 1*m*-30, a storage 1*m*-40, and a controller 1*m*-50.

The RF processor 1*m*-10 may perform a function for transmitting and receiving a signal via a radio channel, such as signal conversion between bands and amplification. In other words, the RF processor 1*m*-10 may up-convert a baseband signal provided by the baseband processor 1*m*-20 into an RF signal, transmit the RF signal via an antenna, and down-convert the RF signal received via the antenna into a baseband signal. For example, the RF processor 1*m*-10 may include a transmit filter, a receive filter, an amplifier, a mixer, an oscillator, a DAC, and an ADC. Although only a single antenna is shown in FIG. 1M, a first access node may include a plurality of antennas. Furthermore, the RF processor 1*m*-10 may include a plurality of RF chains. In addition, the RF processor 1*m*-10 may perform beamforming. For beamforming, the RF processor 1*m*-10 may adjust a phase and a magnitude of each of the signals transmitted or received via a plurality of antennas or antenna elements. The RF processor 1*m*-10 may also perform an MIMO DL operation by transmitting one or more layers.

The baseband processor 1*m*-20 may perform a function of converting between a baseband signal and a bitstream according to a physical layer specification of a first radio access technology. For example, for data transmission, the baseband processor 1*m*-20 may generate complex symbols by encoding and modulating a transmit bitstream. Furthermore, for data reception, the baseband processor 1*m*-20 may reconstruct a receive bitstream by demodulating and decoding a baseband signal provided by the RF processor 1*m*-10. For example, according to an OFDM scheme, in data transmission, the baseband processor 1*m*-20 may generate complex symbols by encoding and modulating a transmit bitstream, map the complex symbols to subcarriers, and then construct OFDM symbols by performing an IFFT operation and CP insertion. Furthermore, in data reception, the baseband processor 1*m*-20 may divide a baseband signal provided by the RF processor 1*m*-10 into OFDM symbols, reconstruct signals mapped to subcarriers by performing an FFT operation, and then reconstruct a receive bitstream via demodulation and decoding. The baseband processor 1*m*-20 and the RF processor 1*m*-10 transmit and receive signals as described above. Thus, the baseband processor 1*m*-20 and the RF processor 1*m*-10 may also be referred to as a transmitter, a receiver, a transceiver, or a wireless communicator. The backhaul communicator 1*m*-30 may provide an interface for performing communication with other nodes in a network. The base station may transmit and receive a signal to and from the UE via the baseband processor 1*m*-20 and the RF processor 1*m*-10, and the signal may include control information and data.

The storage 1*m*-40 may store basic programs, application programs, and data such as configuration information for operations of the base station. In particular, the storage 1*m*-40 may store information about a bearer assigned to a connected UE, a measurement result reported by the connected UE, etc. Furthermore, the storage 1*m*-40 may store information that is a criterion for determining whether to provide or stop multi-connectivity to the UE. The storage 1*m*-40 provides stored data at the request of the controller 1*m*-50. The storage 1*m*-40 may be composed of storage media, such as ROM, RAM, hard discs, CD-ROM, and DVDs, or a combination thereof. Furthermore, the storage 1*m*-40 may include a plurality of memories. In an embodiment, the storage 1*m*-40 may store a program for supporting beam-based cooperative communication.

The controller 1*m*-50 controls all operations of the primary base station. For example, the controller 1*m*-50 transmits and receives a signal via the baseband processor 1*m*-20 and the RF processor 1*m*-10 or via the backhaul communicator 1*m*-30. Furthermore, the controller 1*m*-50 writes and reads data to and from the storage 1*m*-40. To do so, the controller 1*m*-50 may include at least one processor.

Figure 2A:
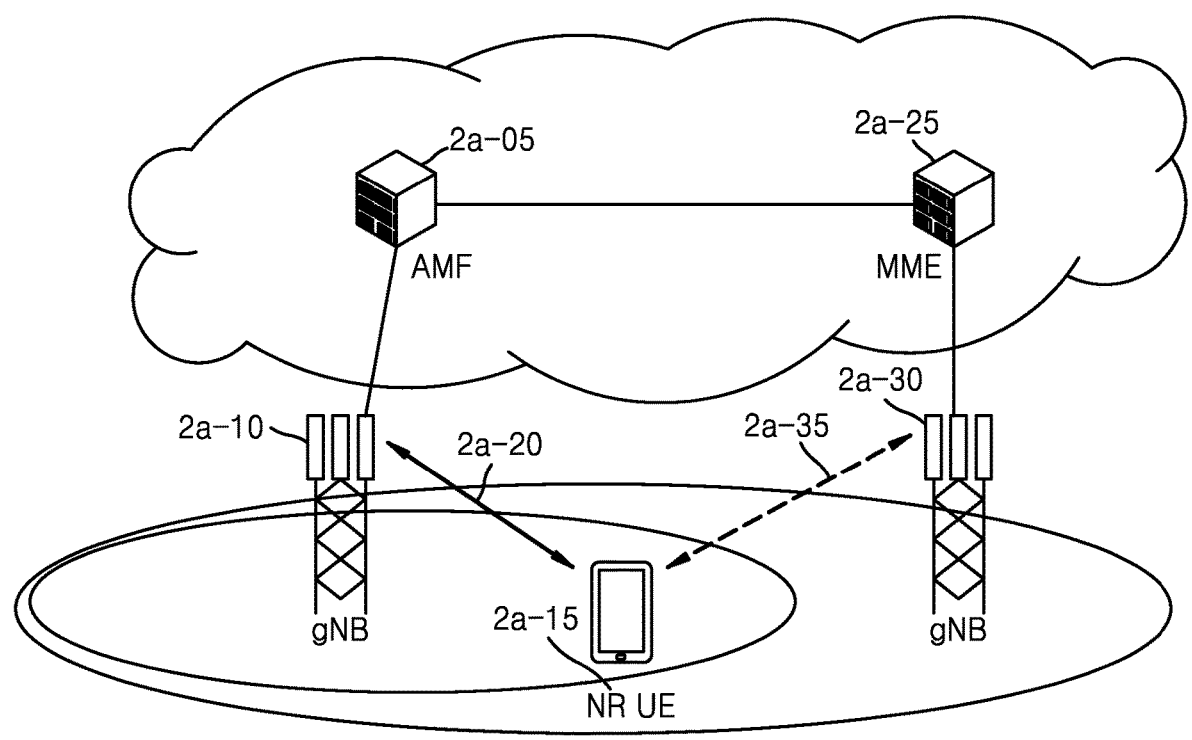
FIG. 2A is a diagram illustrating an LTE base station connected to a next-generation mobile communication network to which an embodiment is applied.

FIG. 2A is a diagram illustrating an LTE base station connected to a next-generation mobile communication network to which an embodiment is applied.

An existing LTE base station 2*a*-30 is connected to an MME 2*a*-25, which is a network entity. On the other hand, even though a next-generation mobile communication base station may be connected to a next-generation mobile communication network (NG core) 2*a*-05, the existing LTE base station 2*a*-30 may be upgraded and then connected to the NG core 2*a*-05. The upgraded LTE base station is referred to as an evolved/enhanced LTE (eLTE) base station 2*a*-10. The eLTE base station 2*a*-10 may be connected to an existing MME, a next-generation mobile communication network, or both. If the eLTE base station 2*a*-10 is connected only to an NG core, only a UE 2*a*-15 supporting eLTE may be connected to the eLTE base station 2*a*-10 and enables communication with the next-generation mobile network 2*a*-05. On the other hand, even if an existing UE attempts to connect to the eLTE base station 2*a*-10, the existing UE cannot communicate with the next-generation mobile communication network 2*a*-05. Thus, it is necessary to prevent the existing UE from camping on the eLTE base station 2*a*-10 connected only to the NG core. If an eLTE base station is connected to both an NG core and an evolved packet core (EPC), the eLTE base station may support both a UE supporting eLTE and an existing UE. Each UE establishes a connection to a network that it can support.

Figure 2B:
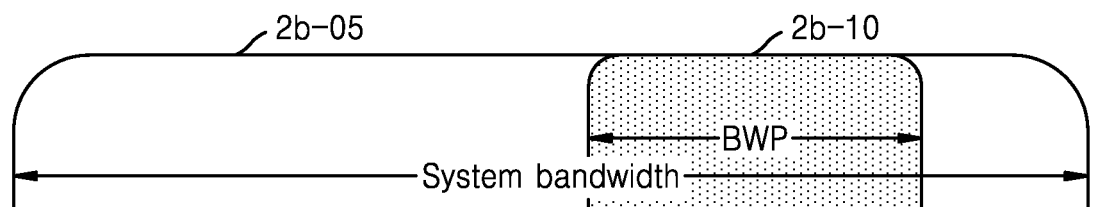
FIG. 2B is a diagram for describing a scenario in which a bandwidth part (BWP) is applied in a next-generation mobile communication system to which an embodiment is applied.
Figure 2B:
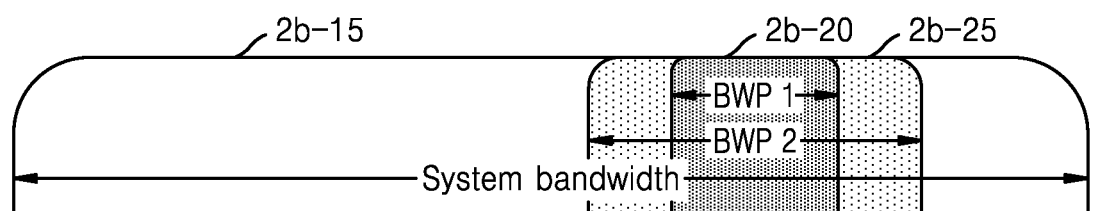
Figure 2B:
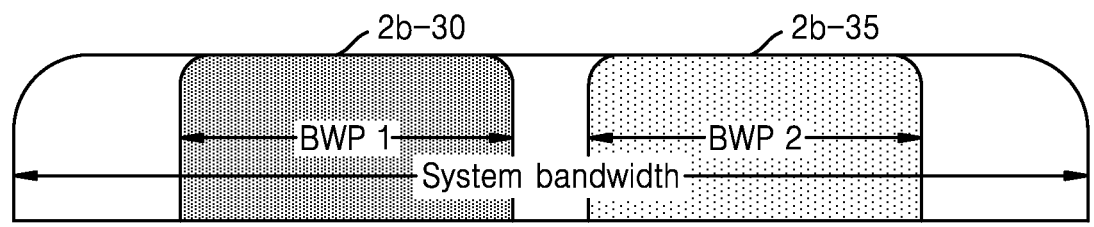

FIG. 2B is a diagram for describing a scenario in which a bandwidth part (BWP) is applied in a next-generation mobile communication system to which an embodiment is applied.

A BWP application technology refers to a technology by which a UE performs communication using only a part of a system bandwidth to be used by a cell. The BWP may be used to reduce the manufacturing costs of the UE or save UE power consumption. The BWP may be configured by a base station only for a UE supporting the BWP.

Referring to FIG. 2B, there may be three BWP operating scenarios in the next-generation mobile communication system.

A first scenario is to apply a BWP for a UE that supports only a bandwidth 2b-10 that is narrower than a system bandwidth 2b-05 to be used by a cell. To reduce manufacturing costs, a specific UE may be developed to support a limited bandwidth. The UE may need to report to the base station its support for only the limited bandwidth, and accordingly, the base station may configure a BWP with a maximum bandwidth or less that is supported by the UE.

A second scenario is to apply a BWP for reducing UE power consumption. According to an embodiment, although a UE performs communication by using the overall system bandwidth 2b-15 used by a cell or a BWP 2b-20, a serving base station may configure a narrower bandwidth 2b-25 for the power-saving purpose.

A third scenario is to apply individual BWPs corresponding to different numerologies. Numerologies may be used to diversify physical layer configurations in order to implement optimal data transmission according to various service requirements. According to an embodiment, in an orthogonal frequency-division multiple access (OFDMA) structure including a plurality of subcarriers, subcarrier spacing (SCS) may be variably adjusted according to a certain requirement. The UE may perform communication by simultaneously using a plurality of numerologies. In this case, because physical layer configurations respectively corresponding to the numerologies differ, the UE may apply different numerologies to separate BWPs 2b-30 and 2b-35.

Figure 2C:
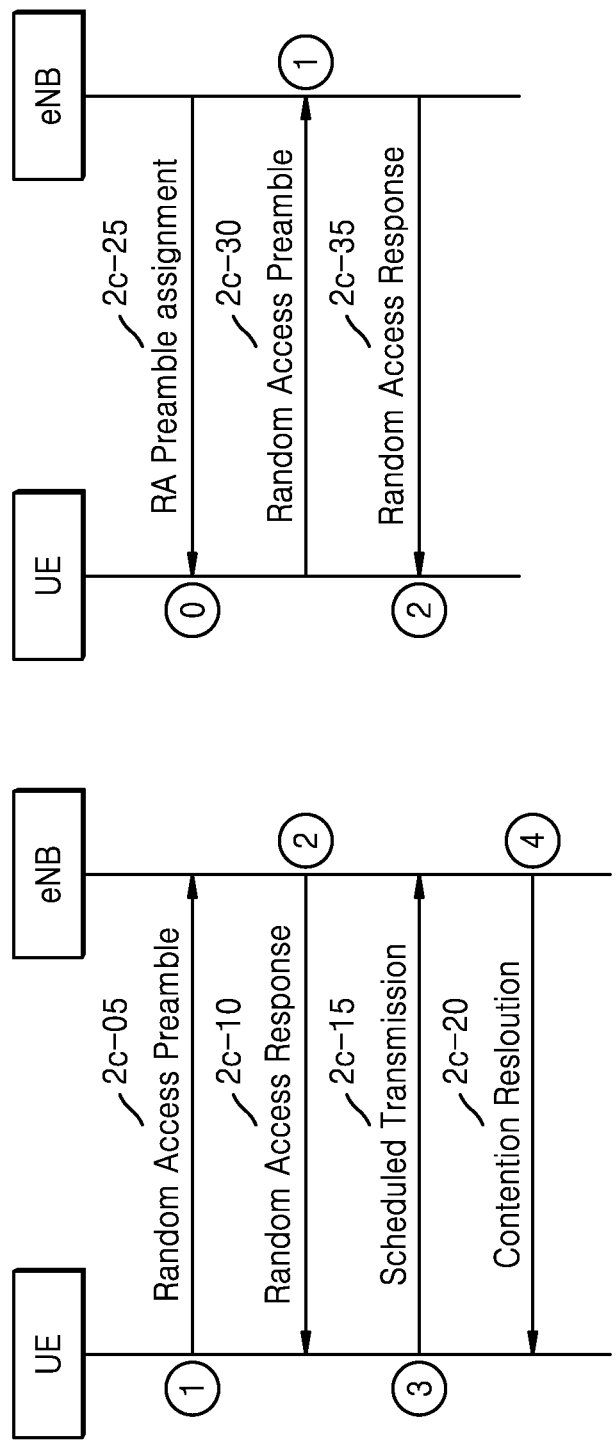
FIG. 2C is a diagram illustrating a random access procedure in a mobile communication system to which an embodiment is applied.

FIG. 2C is a diagram illustrating a random access procedure in a mobile communication system to which an embodiment is applied.

A random access procedure is performed when adjusting UL synchronization or transmitting data to a network. In detail, the random access procedure may be performed when switching from a standby mode to a connected mode, when performing RRC re-establishment, when performing a handover, and when starting UL data and DL data. In mobile communication systems such as LTE and NR systems, the random access procedure may be largely classified into a contention based random access procedure and a non-contention based random access procedure.

Hereinafter, the present disclosure will be described in more detail based on an LTE system. The same or similar processes and messages as described herein may be applied to an NR system.

FIG. 2C(a) is a diagram for explaining a contention based random access procedure.

In operation 2c-05, when a UE receives a dedicated preamble from a base station (eNB), the UE applies and transmits the preamble. Otherwise, the UE selects one of two preamble groups and then a preamble belonging to the selected group. The two preamble groups are referred to as group A and group B. When a channel quality state is better than a specific threshold value and a size of a third message (RACH message 3, hereinafter referred to as 'Msg3') is greater than a specific threshold value, a preamble belonging to the group A may be selected, or otherwise, a preamble belonging to the group B may be selected.

In operation 2c-10, the eNB may transmit a random access response (RAR) to the UE.

When the UE transmits the preamble in an n-th subframe in operation 2c-05, the UE may start a RAR window at an n+3-th subframe and monitor whether the RAR is transmitted within a period of the RAR window.

Scheduling information of the RAR may be indicated by a random access radio network temporary identifier (RA-RANTI) used on a physical downlink control channel (PDCCH). The RA-RNTI may be derived using the time used to transmit the preamble and a position of a radio resource on a frequency axis. The RAR may include a timing advance command, a UL grant, and a temporary cell-RNTI (C-RNTI). When the RAR is successfully received in the RAR window, the UE may transmit the Msg3 by using the UL grant included in the RAR in operation 2c-15. The Msg3 may include different pieces of information depending on the purpose of the random access. Table 1 shows information carried in the Msg3 according to an embodiment.

TABLE 1

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

When the RAR is received in the n-th subframe, the Msg3 may be transmitted in an n+6-th subframe. HARQ is applicable for the Msg3 transmission.

In operation 2c-20, the eNB may transmit a contention resolution (CR) message to the UE.

After transmitting the Msg3 in operation 2c-15, the UE may run a specific timer and monitor a CR message until the timer expires. The CR message may include a CR MAC control element (CE) as well as an RRC Connection Setup or RRC Connection Reestablishment message according to the purpose of the random access procedure.

The contention based random access procedure may be performed by applying carrier aggregation (CA) and dual connectivity (DC). When the CA is configured, the random access procedure may be performed only on a primary cell (PCell). In other words, the UE may transmit a preamble only on the PCell and receive a RAR on the PCell. Msg3 may also be transmitted on the PCell. However, a fourth message (RACH Message 4, hereinafter referred to as Msg4) may be received on another cell that is cross-scheduled. When the DC is configured, the random access procedure may be performed only on PCell or primary-secondary cell (PSCell). In other words, the UE may transmit the preamble only on the PCell or PSCell and receive the RAR on the PCell or PSCell. The Msg3 may also be transmitted on the PCell or PSCell. However, Msg4 may be received on another cell that is cross-scheduled.

FIG. 2C(b) is a diagram for explaining a non-contention random access procedure.

In operation 2c-25, the eNB may provide the UE with a preamble dedicatedly assigned to a specific UE and information about a radio resource used for transmitting the preamble.

In operation 2c-30, the UE may transmit the assigned preamble to the eNB by using the radio resource.

In operation 2c-35, the eNB may transmit a RAR to the UE. Since contention does not occur, a contention resolution process is not required.

The non-contention based random access procedure may be performed by applying CA and DC. When the CA is configured, the random access procedure may be performed on PCell and secondary cell (SCell). In other words, the UE may transmit a preamble and Msg3 on the PCell and SCell. However, the UE may receive a RAR only on the PCell. When the DC is configured, the random access procedure may be performed on PCell, PSCell, or SCell. In other words, the UE may transmit a preamble and Msg3 on the PCell, PSCell, or Scell. However, when the UE transmits a preamble on a cell in a master cell group (MCG), the UE may receive a RAR only on the PCell. When transmitting a preamble on a cell in a secondary cell group (SCG), the UE may receive a RAR only on the PScell.

The RAR includes timing advance command (TAC) information. In an OFDMA-based mobile communication system, only when signals transmitted by different UEs are received at a base station with the same slot timing, the signals are decodable. Thus, by taking into account reception timing of a preamble received during a random access procedure, the base station may transmit a RAR message by including therein TAC information for adjusting reception timing of signals received after the preamble. The UE that has received the TAC information may transmit Msg3 by adjusting its transmission timing based on the TAC information.

Figure 2D:
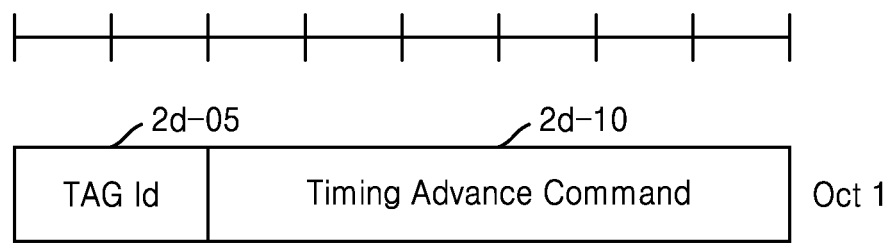
FIG. 2D is a diagram illustrating a structure of a timing advance command (TAC) medium access control (MAC) control element (CE) in a mobile communication system to which an embodiment is applied.

FIG. 2D is a diagram illustrating a structure of a TAC MAC CE in a mobile communication system to which an embodiment is applied.

Another method of providing TAC information is to use a TAC MAC CE. After completing a random access procedure, a UE may receive the TAC MAC CE in a connected mode. Upon receiving the TAC MAC CE, the UE needs to readjust transmission timing according to the information. In a scenario in which a plurality of transceivers or base stations are configured to provide services such as in CA or DC, one or more cells with the same UL timing may exist. A group of cells having the same UL timing is called a Timing Advance Group (TAG). Cells belonging to one TAG may all have the same UL timing. The TAC MAC CE may have a size of 1 byte, and the first 2 bits may indicate a TAG 2d-05 while the remaining 6 bits may indicate TAC information 2d-10. Upon receiving the TAC MAC CE, the UE may readjust the UL timing of all serving cells belonging to the indicated TAG according to the received TAC information. In this case, it is necessary to determine when to apply the readjusted UL timing.

Figure 2E:
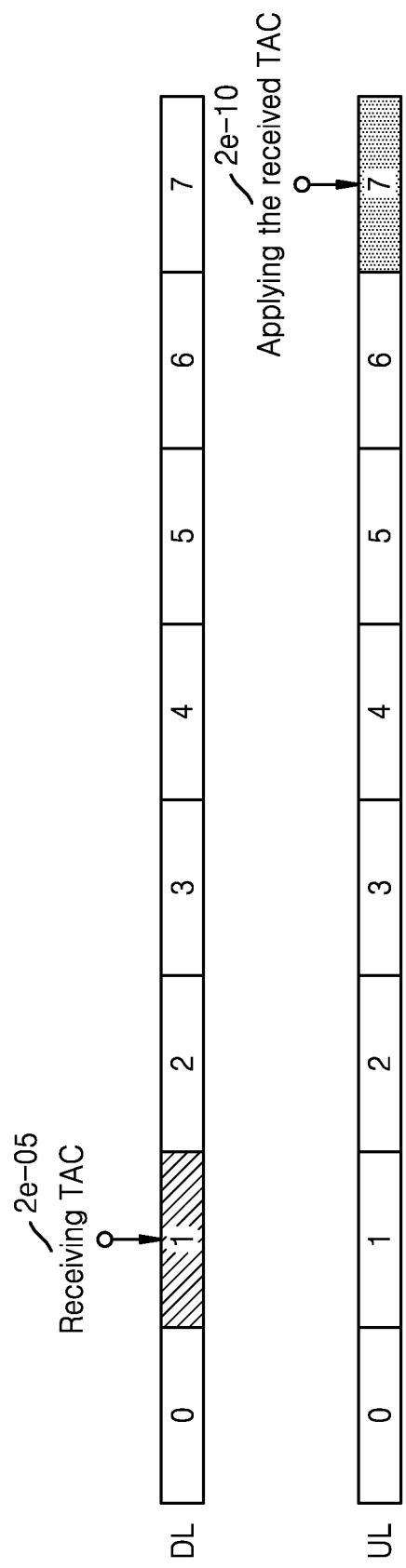
FIG. 2E is a diagram for explaining timing at which a TAC is applied when subcarrier spacings (SCSs) for uplink and downlink are equal to each other in a mobile communication system to which an embodiment is applied.

FIG. 2E is a diagram for explaining timing at which a TAC is applied when subcarrier spacings (SCSs) for UL and DL are equal to each other in a mobile communication system to which an embodiment is applied.

A UE may determine when to apply readjusted UL timing based on a scheduling unit. When SCSs for UL and DL are equal to each other, a UL scheduling unit is the same as a DL scheduling unit. A scheduling unit is usually referred to as a slot, a subframe, a frame, etc., and the scheduling unit and its length differ depending on a type of a mobile communication system. Assuming that a slot is the basic scheduling unit, if TAC information is received in DL slot n via a RAR or TAC MAC CE (2e-05), the UE may apply the TAC information from the beginning of UL slot n+k (2e-10). In the embodiment described with reference to FIG. 2E, the value of k may be 6. In this case, UL and DL slot numbers may be assigned to match each other in terms of timing. In addition, due to characteristics of UL and DL, the timings for UL and DL do not need to be precisely matched.

Figure 2F:
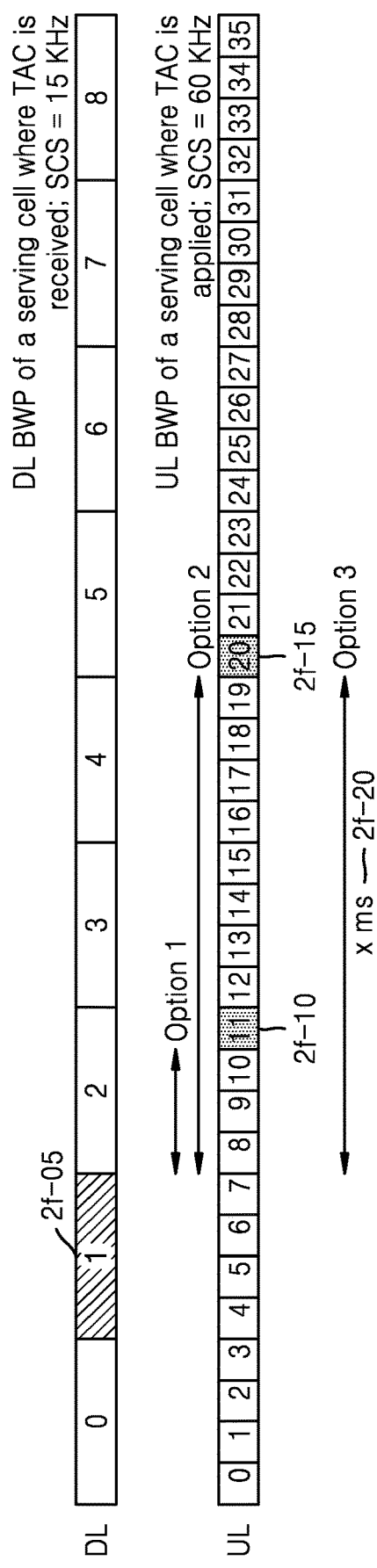
FIG. 2F is a diagram for explaining timing at which a TAC is applied when subcarrier spacings (SCSs) for uplink and downlink are different from each other, according to an embodiment.

FIG. 2F is a diagram for explaining the timing at which a TAC is applied when subcarrier spacings (SCSs) for UL and DL are different from each other, according to an embodiment.

When SCSs for UL and DL are different, it may be understood that scheduling units in UL and DL differ. In an NR system according to an embodiment, a different numerology may be applied for each serving cell, which means that a scheduling units may be different due to different SCSs. Furthermore, one or more BWPs may be configured even for one cell in UL and DL. Each of the BWPs may have its own numerology. Thus, this means that each BWP may have a different SCS and a scheduling unit may be different across the BWPs. When the UE determines when to apply readjusted UL timing based on a scheduling unit, if SCSs in UL and DL are different, a time of applying the readjusted UL timing may vary according to which SCS in UL or DL is to be applied. Three options are set forth below in the present disclosure. Although the three options are described based on a BWP, the same is applicable to UL and DL of serving cells.

Option 1: The UE receives a TAC at slot n of a DL BWP and applies the received TAC to a UL BWP after slot k based on a specific UL BWP. According to an embodiment, the UE may apply the received TAC to all UL BWPs in a TAG to which the DL BWP belongs, all UL BWPs belonging to a TAG indicated in the TAC information, or a UL BWP linked to the DL BWP. In the embodiment described with reference to FIG. 2F, n=1 and k=4. Changes to the specification are as follows.

The UE shall adjust its UL transmission timing on a UL BWP, for a TAC received in time slot n of a DL BWP, at time slot m+k of the UL BWP where m is the slot number of UL BWP which is closest to the time slot n of the DL BWP.

Option 2: The UE receives a TAC at slot n of a DL BWP and applies the received TAC to a UL BWP after slot k based on the DL BWP. According to an embodiment, the UE may apply the received TAC to all UL BWPs in a TAG to which the DL BWP belongs, all UL BWPs belonging to a TAG indicated in the TAC information, or a UL BWP linked to the DL BWP. In the embodiment described with reference to FIG. 2F, n=1 and k=4. Changes to the specification are as follows.

The UE shall adjust its UL transmission timing on a UL BWP, for a TAC received in time slot n of a DL BWP, at time slot m of the UL BWP where m is the slot number of UL BWP which is closest to the time slot n+k of the DL BWP.

Option 3: The UE receives a TAC at slot n of a DL BWP and applies the received TAC to a UL BWP after a lapse of absolute time x corresponding to a slot number. According to an embodiment, the UE may apply the received TAC to all UL BWPs in a TAG to which the DL BWP belongs, all UL BWPs belonging to a TAG indicated in the TAC information, or a UL BWP linked to the DL BWP. Changes to the specification are as follows.

The UE shall adjust its UL transmission timing on a UL BWP, for a TAC received in time slot n of a DL BWP, at time slot n+x ms.

Figure 2G:
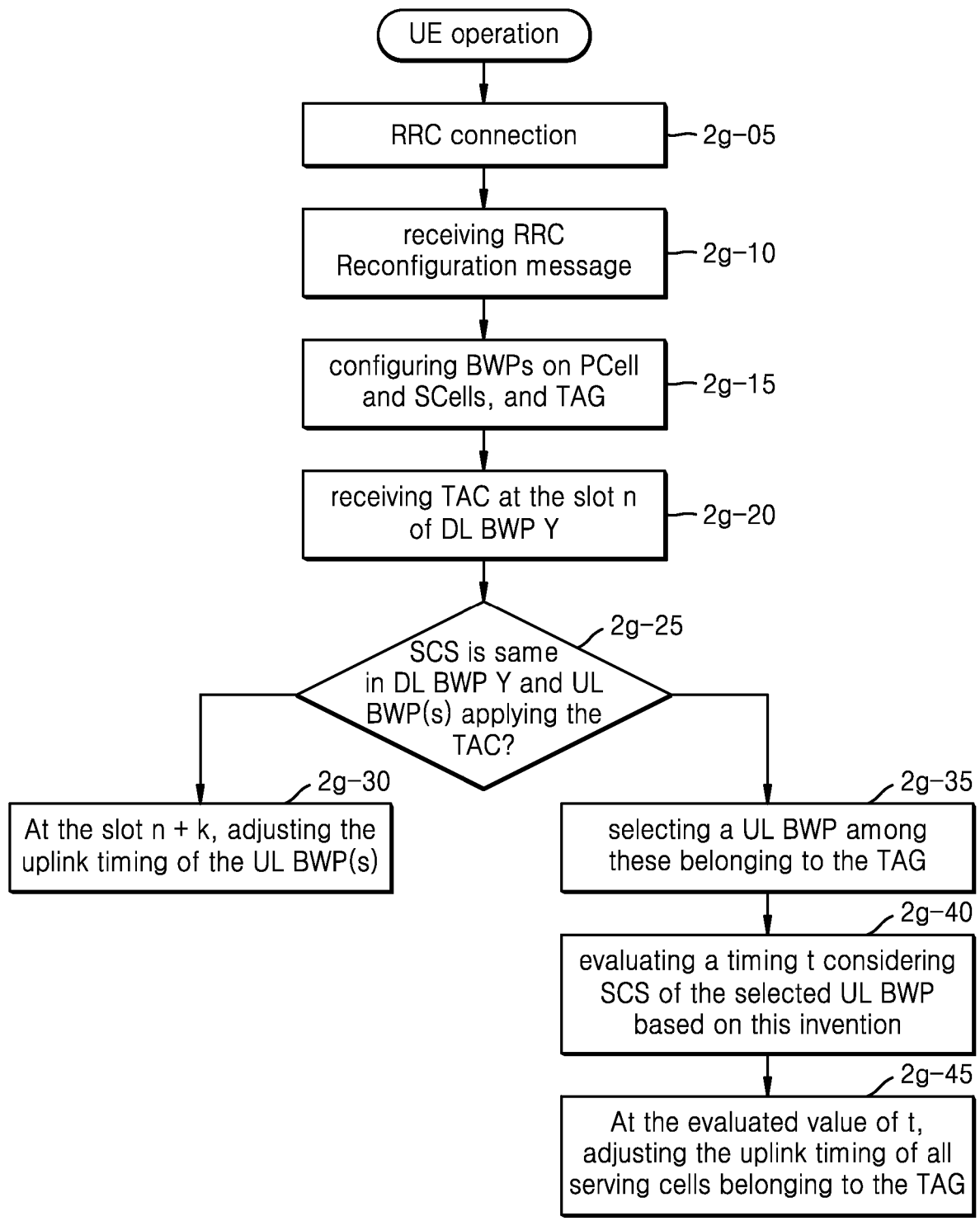
FIG. 2G is a flowchart illustrating operations of a UE, according to an embodiment.

FIG. 2G is a flowchart illustrating operations of a UE, according to an embodiment.

In operation 2g-05, the UE establishes an RRC connection with the base station.

In operation 2g-10, the UE receives RRC configuration information from the base station. The RRC configuration information may include configuration information for BWPs on PCell and SCells. Furthermore, the RRC configuration information may include information indicating which TAG each PCell, SCell or BWP belongs to.

In operation 2g-15, the UE sets the RRC configuration information.

In operation 2g-20, the UE receives a TAC at slot n of a DL BWP. The TAC may be applied to a predetermined UL BWP. The predetermined UL BWP may satisfy one of the following requirements.

All UL BWPs included in a TAG to which the DL BWP belongs

All UL BWPs belonging to a TAG indicated in the TAC information

A UL BWP linked to the DL BWP

In operation 2g-25, the UE determines whether a SCS of the DL BWP is the same as a SCS of all UL BWPs to which the TAC is to be applied.

In operation 2g-30, when the SCS of the DL BWP is the same as the SCS of UL BWPs, the UE applies, to the UL BWP, a TAC received at slot n+k in a scheduling unit determined depending on the SCS.

In operation 2g-35, when a SCS of at least one UL BWP is different from the SCS of the DL BWP, the UE may select one UL BWP according to a predetermined rule in Option 1. According to an embodiment, the UE may select a UL BWP having a longest SCS. Alternatively, the UE may select a UL BWP with a minimum SCS. In Options 2 and 3, it is not necessary to select such a UL BWP.

In operation 2g-40, the UE calculates a timing at which the received TAC is applied according to Option 1, 2 or 3.

In operation 2g-45, the UE applies the received TAC at the calculated timing.

Figure 2H:
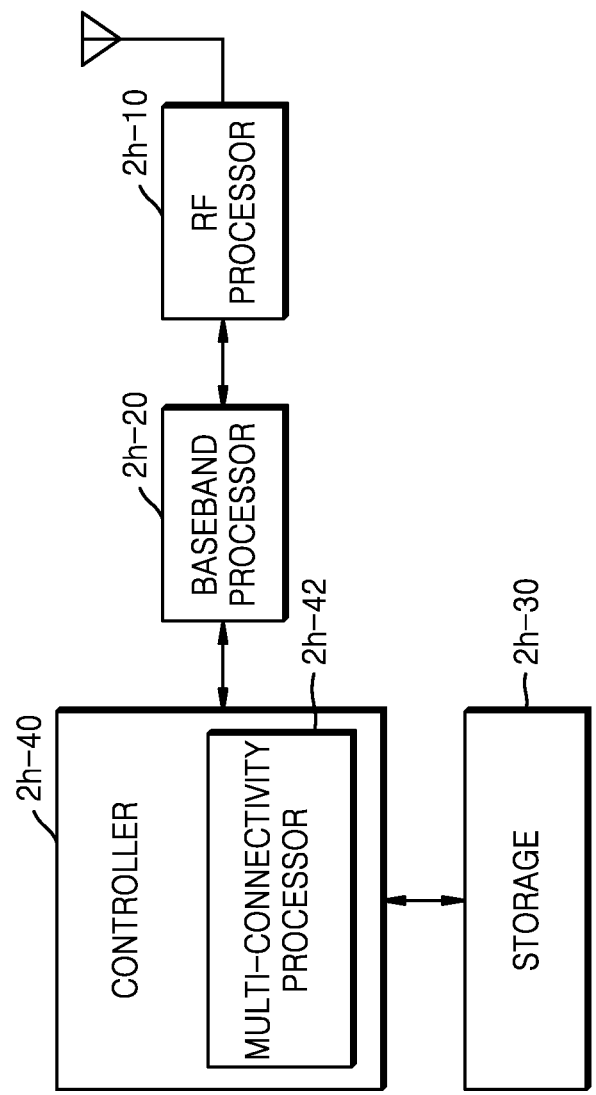
FIG. 2H is a block diagram of a structure of a UE according to an embodiment.

FIG. 2H is a block diagram of a structure of a UE according to an embodiment.

Referring to 2H, the UE includes an RF processor 2h-10, a baseband processor 2h-20, a storage 2h-30, and a controller 2h-40.

The RF processor 2h-10 may perform a function for transmitting and receiving a signal via a radio channel, such as signal conversion between bands and amplification. In other words, the RF processor 2h-10 may up-convert a baseband signal provided by the baseband processor 2h-20 into an RF signal, transmit the RF signal via an antenna, and down-convert the RF signal received via the antenna into a baseband signal. For example, the RF processor 2h-10 may include a transmit filter, a receive filter, an amplifier, a mixer, an oscillator, a DAC, and an ADC.

Although only a single antenna is shown in FIG. 2H, the UE may include a plurality of antennas. The RF processor 2h-10 may also include a plurality of RF chains. Furthermore, the RF processor 2h-10 may perform beamforming. For beamforming, the RF processor 2h-10 may adjust a phase and a magnitude of each of the signals transmitted or received via a plurality of antennas or antenna elements. The RF processor 2h-10 may also perform an MIMO operation during which multiple layers may be received.

The baseband processor 2h-20 may perform a function of converting between a baseband signal and a bitstream according to a physical layer specification of a system. For example, for data transmission, the baseband processor 2h-20 may generate complex symbols by encoding and modulating a transmit bitstream. For data reception, the baseband processor 2h-20 may reconstruct a receive bitstream by demodulating and decoding a baseband signal provided by the RF processor 2h-10. For example, according to an OFDM scheme, in data transmission, the baseband processor 2h-20 may generate complex symbols by encoding and modulating a transmit bitstream, map the complex symbols to subcarriers, and then construct OFDM symbols by performing an IFFT operation and CP insertion. Furthermore, in data reception, the baseband processor 2h-20 may divide a baseband signal provided by the RF processor 2h-10 into OFDM symbols, reconstruct signals mapped to subcarriers by performing an FFT operation, and then reconstruct a receive bitstream via demodulation and decoding.

The baseband processor 2h-20 and the RF processor 2h-10 transmit and receive signals as described above. Accordingly, the baseband processor 2h-20 and the RF processor 2h-10 may also be referred to as a transmitter, a receiver, a transceiver, or a communicator. Furthermore, at least one of the baseband processor 2h-20 and the RF processor 2h-10 may include multiple communication modules to support multiple different radio access technologies. Furthermore, at least one of the baseband processor 2h-20 and the RF processor 2h-10 may include different communication modules to process signals in different frequency bands. For example, the different radio access technologies may include a wireless local area network (LAN) (e.g., IEEE 802.11), a cellular network (e.g., LTE), etc. In addition, the different frequency bands may include a SHF band (e.g., 2.5 GHz and 5 GHz) and an mmWave band (e.g., 60 GHz). The UE may transmit or receive a signal to or from a base station via the baseband processor 2h-20 and the RF processor 2h-10. In this case, the signal may include control information and data.

The storage 2h-30 may store basic programs, application programs, and data such as configuration information for operations of the UE. In particular, the storage 2h-30 may store information related to a second access node for performing a wireless communication by using a second radio access technology. The storage 2h-30 provides stored data at the request of the controller 2h-40. The storage 2h-30 may be composed of storage media, such as ROM, RAM, hard discs, CD-ROM, and DVDs, or a combination thereof. Furthermore, the storage 2h-30 may include a plurality of memories. In an embodiment, the storage 2h-30 may store a program for supporting beam-based cooperative communication.

The controller 2h-40 controls all operations of the UE. For example, the controller 2h-40 may transmit and receive signals via the baseband processor 2h-20 and the RF processor 2h-10. The controller 2h-40 may also write and read data to and from the storage 2h-30. To do so, the controller 2h-40 may include at least one processor. For example, the controller 2h-40 may include a CP for controlling communication and an AP for controlling an upper layer such as an application program.

Figure 2I:
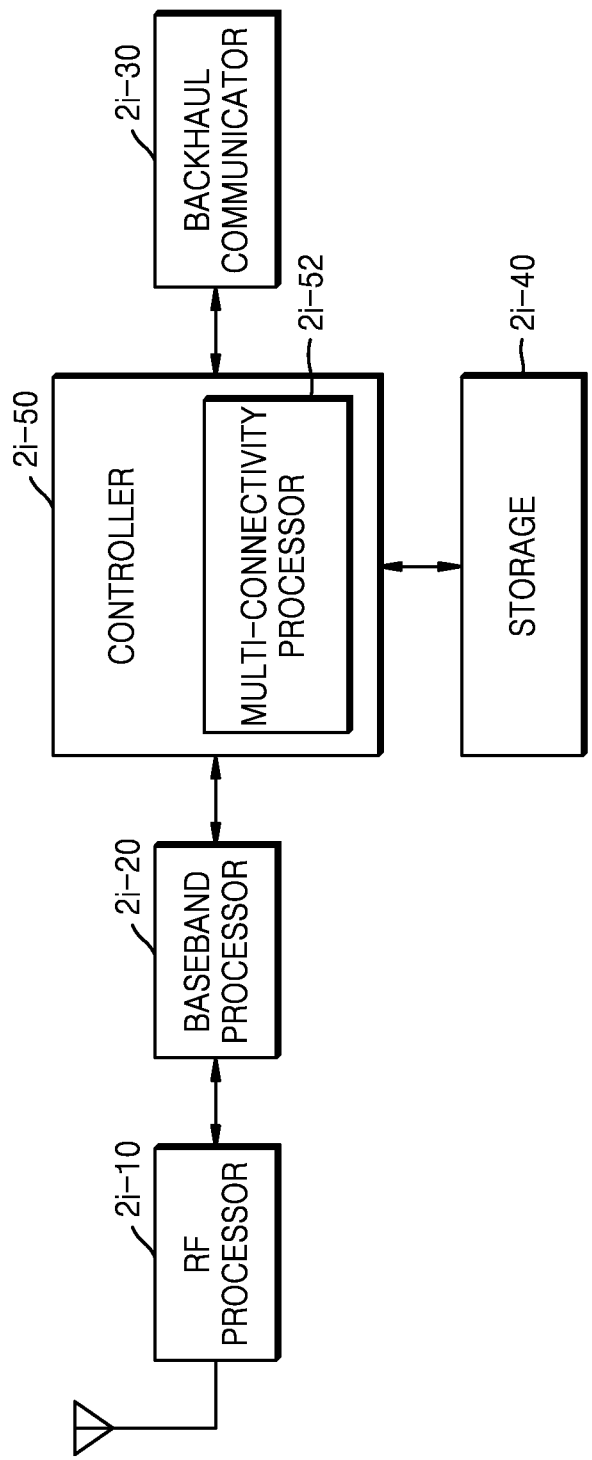
FIG. 2I is a block diagram of a configuration of a base station according to an embodiment.

FIG. 2I is a block diagram of a configuration of a base station according to an embodiment.

Referring to FIG. 2I, a base station may include an RF processor 2i-10, a baseband processor 2i-20, a backhaul communicator 2i-30, a storage 2i-40, and a controller 2i-50.

The RF processor 2i-10 may perform a function for transmitting and receiving a signal via a radio channel, such as signal conversion between bands and amplification. In other words, the RF processor 2i-10 may up-convert a baseband signal provided by the baseband processor 2i-20 into an RF signal, transmit the RF signal via an antenna, and down-convert the RF signal received via the antenna into a baseband signal. For example, the RF processor 2i-10 may include a transmit filter, a receive filter, an amplifier, a mixer, an oscillator, a DAC, and an ADC. Although only a single antenna is shown in FIG. 2I, a first access node may include a plurality of antennas. Furthermore, the RF processor 2i-10 may include a plurality of RF chains. In addition, the RF processor 2i-10 may perform beamforming. For beamforming, the RF processor 2i-10 may adjust a phase and a magnitude of each of the signals transmitted or received via a plurality of antennas or antenna elements. The RF processor 2i-10 may also perform an MIMO DL operation by transmitting one or more layers.

The baseband processor 2i-20 may perform a function of converting between a baseband signal and a bitstream according to the physical layer specification of the first radio access technology. For example, for data transmission, the baseband processor 2i-20 may generate complex symbols by encoding and modulating a transmit bitstream. Furthermore, for data reception, the baseband processor 2i-20 may reconstruct a receive bitstream by demodulating and decoding a baseband signal provided by the RF processor 2i-10. For example, according to an OFDM scheme, in data transmission, the baseband processor 2i-20 may generate complex symbols by encoding and modulating a transmit bitstream, map the complex symbols to subcarriers, and then construct OFDM symbols by performing an IFFT operation and CP insertion. Furthermore, in data reception, the baseband processor 2i-20 may divide a baseband signal provided by the RF processor 2i-10 into OFDM symbols, reconstruct signals mapped to subcarriers by performing an FFT operation, and then reconstruct a receive bitstream via demodulation and decoding. The baseband processor 2i-20 and the RF processor 2i-10 transmit and receive signals as described above. Thus, the baseband processor 2i-20 and the RF processor 2i-10 may also be referred to as a transmitter, a receiver, a transceiver, or a wireless communicator. The base station may transmit or receive a signal to or from a UE via the baseband processor 2i-20 and the RF processor 2i-10. In this case, the signal may include control information and data.

The backhaul communicator 2i-30 may provide an interface for performing communication with other nodes in a network. In other words, the backhaul communicator 2i-30 may convert a bitstream transmitted from the primary base station to another node such as an auxiliary base station, a core network, etc., into a physical signal and convert the physical signal received from the other node into a bitstream.

The storage 2i-40 may store basic programs, application programs, and data such as configuration information for operations of the primary base station. In particular, the storage 2i-40 may store information about a bearer assigned to a connected UE, a measurement result reported by the connected UE, etc. Furthermore, the storage 2i-40 may store information that is a criterion for determining whether to provide or stop multi-connectivity to the UE. The storage 2i-40 provides stored data at the request of the controller 2i-50. The storage 2i-40 may be composed of storage media, such as ROM, RAM, hard discs, CD-ROM, and DVDs, or a combination thereof. Furthermore, the storage 2i-40 may include a plurality of memories. In an embodiment, the storage 2i-40 may store a program for supporting beam-based cooperative communication.

The controller 2i-50 controls all operations of the primary base station. For example, the controller 2i-50 transmits and receives a signal via the baseband processor 2i-20 and the RF processor 2i-10 or via the backhaul communicator 2i-30. Furthermore, the controller 2i-50 writes and reads data to and from the storage 2i-40. To do so, the controller 2i-50 may include at least one processor.

The methods according to the embodiments of the present disclosure described in the appended claims or specification thereof may be implemented in hardware, software, or a combination of hardware and software.

When the methods are implemented in software, a computer-readable storage medium storing at least one program (software module) may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. Furthermore, a plurality of such memories may be included.

Furthermore, the program may be stored in an attachable storage device that may be accessed through communication networks such as the Internet, Intranet, a LAN, a wide LAN (WLAN), and a storage area network (SAN) or a communication network configured in a combination thereof. The storage device may access a device performing methods according to the embodiments of the present disclosure via an external port. Furthermore, a separate storage device on a communication network may also access a device performing the methods according to the embodiments of the present disclosure.

In specific embodiments of the present disclosure, a component included in the present disclosure is expressed in a singular or plural form depending on the specific embodiments. However, singular or plural expressions are selected to be suitable for the presented situations for convenience of description, and the present disclosure is not limited to the singular or plural form. An element expressed in a plural form may be configured as a single element, or an element expressed in a singular form may be configured as a plurality of elements.

The embodiments of the present disclosure disclosed in the present specification and the accompanying drawings have been provided only as specific examples in order to easily describe technical features in the present disclosure and assist in understanding the present disclosure and are not intended to limit the scope of the present disclosure. In other words, it is obvious to those of ordinary skill in the art that other modifications may be implementable based on the technical spirit of the disclosure. Moreover, the embodiments of the present disclosure may be combined with each other for operation when necessary. For example, an embodiment of the disclosure may be combined with parts of other embodiments of the disclosure to operate a base station and a UE. While the embodiments have been described based on an LTE frequency division duplex (FDD) system, other modifications based on the technical spirit of the embodiments may be implementable by other systems such as an LTE time division duplex (TDD) system, a 5G or NR system, etc.

The invention claimed is:

1. A method performed by a user equipment (UE) in a wireless communication system, the method comprising:
receiving, from a base station, timing advance command information for a timing advance group (TAG) in a slot;
determining a first uplink slot associated with the received timing advance command information, based on a minimum subcarrier spacing (SCS) among a plurality of SCSs of all uplink bandwidth parts (BWPs) in the TAG, wherein the first uplink slot is identified as one among a plurality of uplink slots overlapping with the slot where the timing advance command information is received;

identifying, based on the minimum SCS among the plurality of SCSs of the all uplink BWPs in the TAG, a number of second uplink slots associated with an adjustment of uplink transmission timing;

identifying, based on the first uplink slot and the identified number of the second uplink slots, an uplink slot to apply the adjustment of uplink transmission timing; and adjusting, based on the timing advance command information, the uplink transmission timing from the identified uplink slot, wherein the identified uplink slot is associated with a sum of a slot index of the first uplink slot and the number of second uplink slots.

2. The method of claim 1, wherein the timing advance command information is included in a timing advance command medium access control-control element (MAC CE).

3. The method of claim 2, wherein the timing advance command MAC CE includes information indicating the TAG, and wherein the TAG includes a plurality of cells to which the timing advance command information is applied.

4. The method of claim 1, further comprising:
performing uplink transmission based on the adjustment of uplink transmission timing.

5. A user equipment (UE) in a wireless communication system, the UE comprising:
a transceiver; and
at least one processor coupled with the transceiver and configured to:

receive, from a base station via the transceiver, timing advance command information for a timing advance group (TAG) in a slot, determine a first uplink slot associated with the received timing advance command information, based on a minimum subcarrier spacing (SCS) among a plurality of SCSs of all uplink bandwidth parts (BWPs) in the TAG, wherein the first uplink slot is identified as one among a plurality of uplink slots overlapping with the slot where the timing advance command information is received, identify, based on the minimum SCS among the plurality of SCSs of the all uplink BWPs in the TAG, a number of second uplink slots associated with an adjustment of uplink transmission timing, identify, based on the first uplink slot and the identified number of the second uplink slots, an uplink slot to apply the adjustment of uplink transmission timing, and adjust, based on the timing advance command information, the uplink transmission timing from the identified uplink slot, wherein the identified uplink slot is associated with a sum of a slot index of the first uplink slot and the number of second uplink slots.

6. The UE of claim 5, wherein the timing advance command information is included in a timing advance command medium access control-control element (MAC CE).

7. The UE of claim 6, wherein the timing advance command MAC CE includes information indicating the TAG, and wherein the TAG includes a plurality of cells to which the timing advance command information is applied.

8. The UE of claim 5, wherein the at least one processor is further configured to perform uplink transmission based on the adjustment of uplink transmission timing.

* * * * *